US008335012B2

(12) United States Patent
Iguchi

(10) Patent No.: US 8,335,012 B2
(45) Date of Patent: Dec. 18, 2012

(54) IMAGE FORMING APPARATUS, METHOD, AND STORAGE MEDIUM FOR SELECTING DIFFERENT MODE TO INCREASE A DEGREE OF GLOSS OF A PRINT PRODUCT

(75) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 12/371,457

(22) Filed: Feb. 13, 2009

(65) Prior Publication Data

US 2009/0207429 A1 Aug. 20, 2009

(30) Foreign Application Priority Data

Feb. 15, 2008 (JP) ................................ 2008-035097

(51) Int. Cl.
*H04N 1/60* (2006.01)

(52) U.S. Cl. ....... 358/1.9; 358/3.27; 358/1.18; 358/501; 358/537; 358/538; 399/67; 399/122; 399/320

(58) Field of Classification Search ........................ None
See application file for complete search history.

(56) References Cited

U.S. PATENT DOCUMENTS

| | | | | |
|---|---|---|---|---|
| 5,981,121 | A * | 11/1999 | Ide | 430/45.1 |
| 6,101,345 | A * | 8/2000 | Van Goethem et al. | 399/69 |
| 6,687,483 | B2 * | 2/2004 | Chen et al. | 399/341 |
| 7,113,718 | B2 * | 9/2006 | Bobo et al. | 399/67 |
| 7,139,521 | B2 * | 11/2006 | Ng et al. | 399/341 |
| 7,236,734 | B2 * | 6/2007 | Ng et al. | 399/341 |
| 7,321,449 | B2 * | 1/2008 | Ide et al. | 358/1.9 |
| 7,421,231 | B2 * | 9/2008 | Bessho | 399/223 |
| 7,656,556 | B2 * | 2/2010 | Wang | 358/2.1 |
| 7,783,242 | B2 * | 8/2010 | Chigono et al. | 399/341 |
| 2005/0153227 | A1 * | 7/2005 | Kurihara et al. | 430/124 |
| 2006/0133870 | A1 | 6/2006 | Ng | |
| 2007/0071474 | A1 * | 3/2007 | Watanabe et al. | 399/67 |
| 2007/0115487 | A1 * | 5/2007 | Ide et al. | 358/1.4 |
| 2007/0127940 | A1 | 6/2007 | Zaima | |
| 2007/0147865 | A1 * | 6/2007 | Hanada et al. | 399/67 |
| 2011/0243623 | A1 * | 10/2011 | Bobo et al. | 399/341 |

FOREIGN PATENT DOCUMENTS

| | | | |
|---|---|---|---|
| EP | 864942 | A1 | 9/1998 |
| JP | 2004-271910 | A | 9/2004 |
| JP | 2005-338161 | A | 12/2005 |
| JP | 2007-183593 | A | 7/2007 |

* cited by examiner

*Primary Examiner* — Dung Tran
(74) *Attorney, Agent, or Firm* — Canon USA, Inc., IP Division

(57) ABSTRACT

An image forming apparatus includes an acquisition unit configured to acquire image data, a generation unit configured to generate a histogram based on a signal value of each pixel in the image data acquired by the acquisition unit, a derivation unit configured to derive the number of pixels matching a first condition in the histogram generated by the generation unit, and a selection unit configured to select, according to the number of pixels derived by the derivation unit, one of a fixing processing adjustment mode for increasing a degree of gloss of a print product by adjusting fixing processing and a transparent toner mode for increasing a degree of gloss of a print product by using a transparent toner.

10 Claims, 21 Drawing Sheets

1201

1501

2301

2302

IMAGE FORMING APPARATUS, METHOD, AND STORAGE MEDIUM FOR SELECTING DIFFERENT MODE TO INCREASE A DEGREE OF GLOSS OF A PRINT PRODUCT

BACKGROUND OF THE INVENTION

1. Field of the Invention

The present invention relates to a method for outputting a glossy print product.

2. Description of the Related Art

Recently, there is provided a printing apparatus, such as discussed in Japanese Patent Application Laid-Open No. 2007-183593, which uses a transparent and glossy medium as a toner. In this regard, for example, the gloss of an image can be improved and an image can be coated (protected) by applying a transparent toner on the entire surface of a print product.

Furthermore, an image can be output that faithfully reflects a user's desire by applying a transparent toner in a specific character and graphic shape. In addition, the gloss of the color toners can be increased by executing thermal fixing processing at a speed lower than a normal speed on color toners, such as cyan, magenta, yellow, and black (CMYK).

However, the total amount of applied toner is generally restricted to a predetermined amount in an electrophotographic type printing apparatus that uses a toner. The applied toner amount ranging from 0% to 100% can be set for each latent image of each of four colors of CMYK. Therefore, the amount of applied toner up to 400% may be applied in total of the latent images. However, if an input of 400%, for example, has been performed on a sheet in an electrophotographic type printing apparatus, the toner may not be appropriately fixed and may be scattered. Therefore, in this case, an appropriate image cannot be obtained.

In order to address the above-described problem, a method for restricting the total amount of applied toner can be used. More specifically, a printing apparatus can restrict the total amount of applied toner to the amount equal to or smaller than a predetermined amount.

However, the above-described condition for restricting the amount of applied toner becomes more difficult to satisfy when a transparent toner is additionally applied. That is, a similar limit amount, which is applied to the total amount of toners for the four colors of CMYK, must be applied to that for five color toners, which include the toners of four colors of CMYK and the transparent toner.

Thus, in this case, an amount of toner that is applied for each color is reduced. Therefore, it may become difficult to apply the desired gloss to an image to be printed.

Furthermore, in the case of increasing the gloss of the color toner by performing thermal fixing processing at a speed slower than a normal speed, the gloss of only an object part, which is included in an image, increases. In this case, it is difficult to increase the gloss of blank areas of the image in which no object is included. Accordingly, with the above-described conventional method, it is difficult to increase the gloss of an image to be printed in the case of printing image data that has many blank areas or many low-density (high-light) areas of CMYK toners.

SUMMARY OF THE INVENTION

The present invention is directed to an image forming apparatus capable of applying a gloss as appropriate as possible to an image to be printed.

According to an aspect of the present invention, an image forming apparatus includes an acquisition unit configured to acquire image data, a generation unit configured to generate a histogram based on a signal value of each pixel in the image data acquired by the acquisition unit, a derivation unit configured to derive the number of pixels matching a first condition in the histogram generated by the generation unit, and a selection unit configured to select, according to the number of pixels derived by the derivation unit, one of a fixing processing adjustment mode for increasing a degree of gloss of a print product by adjusting fixing processing and a transparent toner mode for increasing a degree of gloss of a print product by using a transparent toner.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

DETAILED DESCRIPTION OF THE EMBODIMENTS

Various exemplary embodiments, features, and aspects of the present invention will now be herein described in detail below with reference to the drawings. The relative arrangement of the components, the numerical expressions, and numerical values set forth in these embodiments are not intended to limit the scope of the present invention.

Before describing an exemplary embodiment of the present invention, a technique that is a premise of exemplary embodiments of the present invention will be described.

To begin with, a printing apparatus that uses a transparent toner and capable of operating in a transparent toner mode will be described. In many cases, a transparent toner is applied at the density of 100% on the entire surface of a print product.

In this regard, various methods can be used for restricting the amount of applied toner with respect to five colors, which include four colors of CMYK and the transparent toner. For example, a method for evenly decreasing the amount of each applied toner of the five colors can be used.

Figure 1:
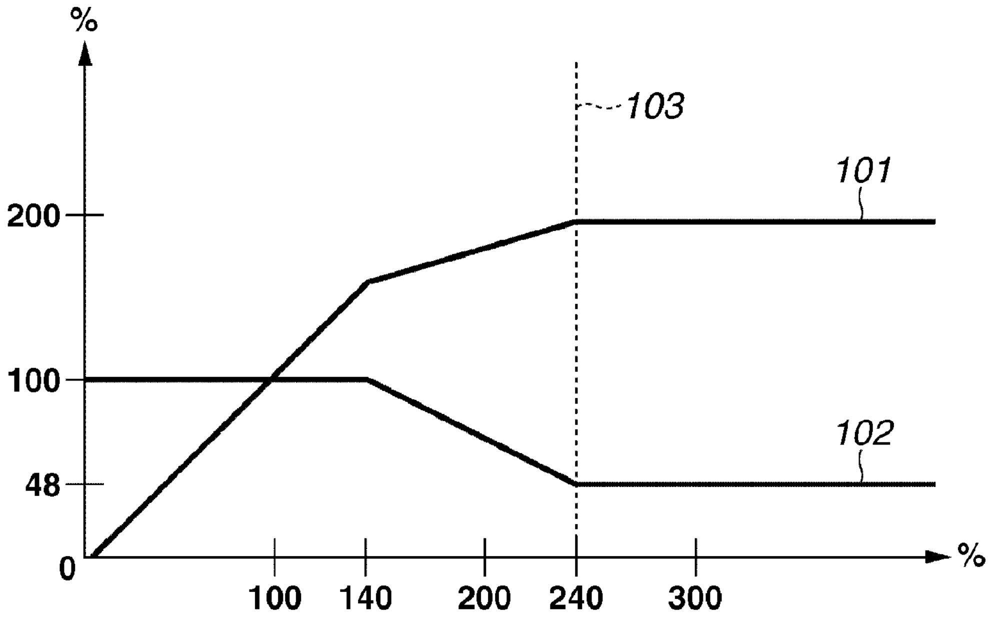
FIG. 1 is an example graph illustrating, when the amount of each of five color toners is decreased evenly, how the amount of toners applied on a print product is restricted according to a premise of exemplary embodiments of the present invention.

FIG. 1 illustrates exemplary processing for restricting the amount of applied toner, which is performed when the amount of applied toners of the five colors is evenly decreased.

Referring to FIG. 1, a horizontal axis indicates input values (instructed values), represented in percentage, of the amount of applied toners (density) of four colors of CMYK. A vertical axis indicates values of the amount of actually applied toners, represented in percentage. Here, the maximum value of the amount of applied toner of each color is 100%. Accordingly, the maximum value of the total amount of applied toners of the four colors of CMYK, for example, is 400%.

In the example illustrated in FIG. 1, a limit value 103 of the total amount of applied toners is 240%. A graph 101 indicates an example of the relationship between an input value of the amount of applied toners of the four colors of CMYK and the value of the amount of actually applied toners of the four colors of CMYK.

A graph 102 indicates an example of the relationship between the input values of the amount of applied toners of the four colors of CMYK and the value of the amount of applied toner of the actually applied transparent toner. In the graph 102, the input value of the amount of applied toner of the transparent toner is 100%.

Referring to FIG. 1, in an area in which the input value of the amount of applied toners of the four colors of CMYK is smaller than the limit value 103, it is essentially necessary to apply the value of the amount of applied toner that is the same as the input value. However, in the example illustrated in FIG. 1, the values of the amount of applied toners of five colors including four color toners of CMYK and the transparent toner are evenly decreased. Accordingly, the amount of applied toners of four colors of CMYK is restricted due to the transparent toner in an area beyond 140%, which is calculated by subtracting 100% (the maximum value of the amount of applied toner of the transparent toner) from the limit value 103 of the amount of applied toner.

In other words, in the case where the 100% transparent toner is applied to the color toners of four colors of CMYK, if the total sum of the input values of the amount of applied toners of the four colors of CMYK exceeds 140%, the color of the image may be changed. Furthermore, the transparent toner itself decreases in the area in which the total sum of the input values of the amount of applied toners of the four colors of CMYK exceeds 140%. As a result, the amount of applied toner of the transparent toner becomes as low as 48%. Accordingly, the gloss of the transparent toner is decreased.

In order to address the above-described problem, a method can be used for restricting the amount of applied toners of five colors including the four colors of CMYK and the transparent toner while maintaining an appropriate amount of applied toners of the four colors of CMYK.

Figure 2:
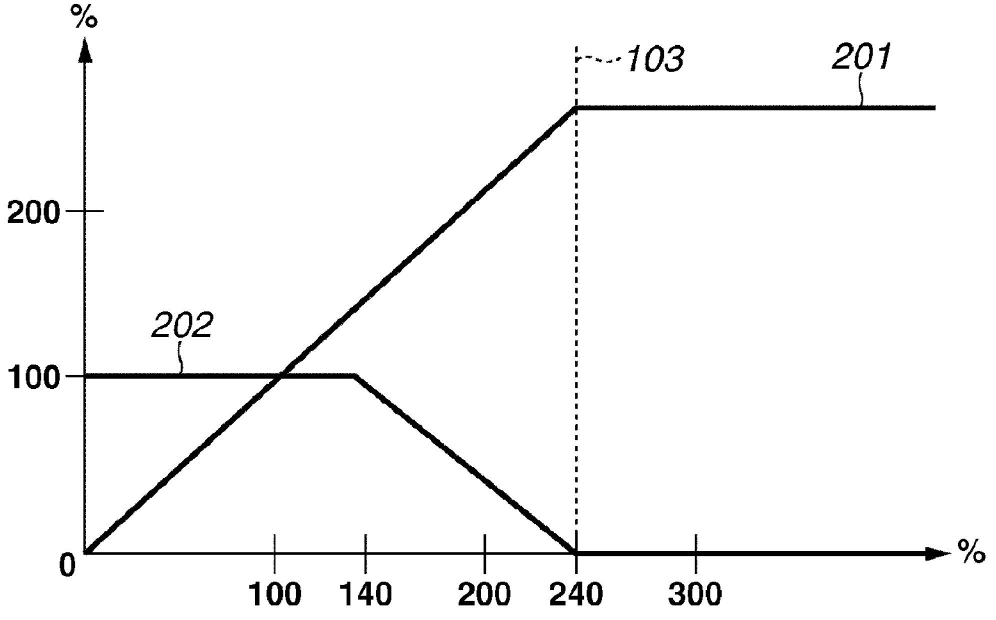
FIG. 2 is an example graph illustrating, when the amount of applied toners of five colors are decreased while maintaining an amount of the four colors of CMYK, how the amount of toners applied on a print product is restricted, according to a premise of exemplary embodiments of the present invention.

FIG. 2 illustrates an example of a method for restricting the amount of applied toners, which is performed when the amount of applied toners of five colors is decreasing while maintaining an appropriate amount of applied toners of the four colors of CMYK.

Referring to FIG. 2, a graph 201 illustrates an example of the relationship between the input values of the amount of applied toners of the four colors of CMYK and the amount of actually applied toners of the four colors of CMYK. On the other hand, a graph 202 illustrates an example of the relationship between the input value of the amount of applied toners of the four colors of CMYK and the value of the amount of applied toner of the actually applied transparent toner.

As illustrated in the graph 201, the amount of applied toners, which is the same as the input value of the amount of applied toners of the four colors of CMYK, is applied as the amount of applied toners of the four colors of CMYK until the input value of the amount of applied toners of the four colors of CMYK reaches the limit value 103. On the other hand, the amount of applied toners of the four colors of CMYK is not restricted.

Accordingly, as illustrated in the graph 202, the amount of applied toner of the actually applied transparent toner starts decreasing in the area in which the input value of the amount of applied toners of the four colors of CMYK exceeds 140% and reaches the value of 0% at the limit value 103.

Accordingly, as the input value of the amount of applied toners of the four colors of CMYK becomes closer to the limit value 103, the amount of applied toner of the transparent toner becomes smaller so as to reach 0%. Thus, in this case, the desired gloss cannot be obtained.

Figure 3A:
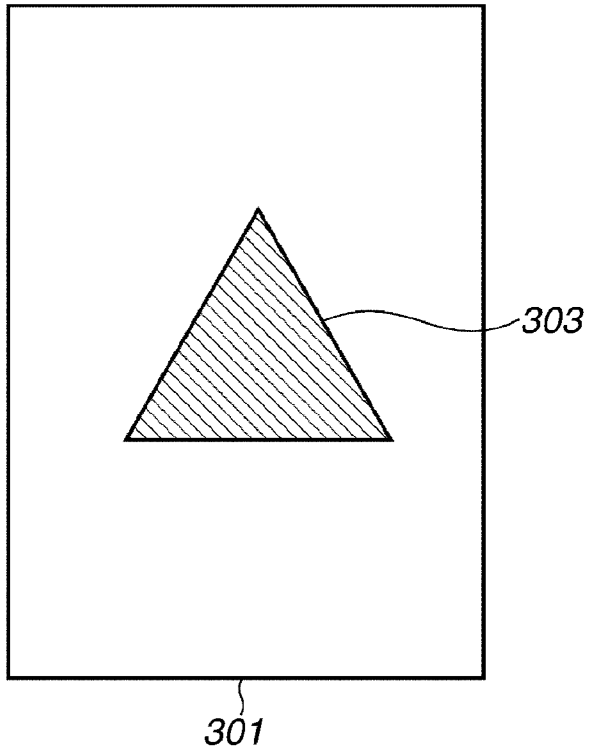
FIGS. 3A and 3B each illustrate an example of an image to be printed on which a 100% transparent toner is applied to an object thereof, for which four colors of CMYK are used, according to a premise of exemplary embodiments of the present invention.
Figure 3B:
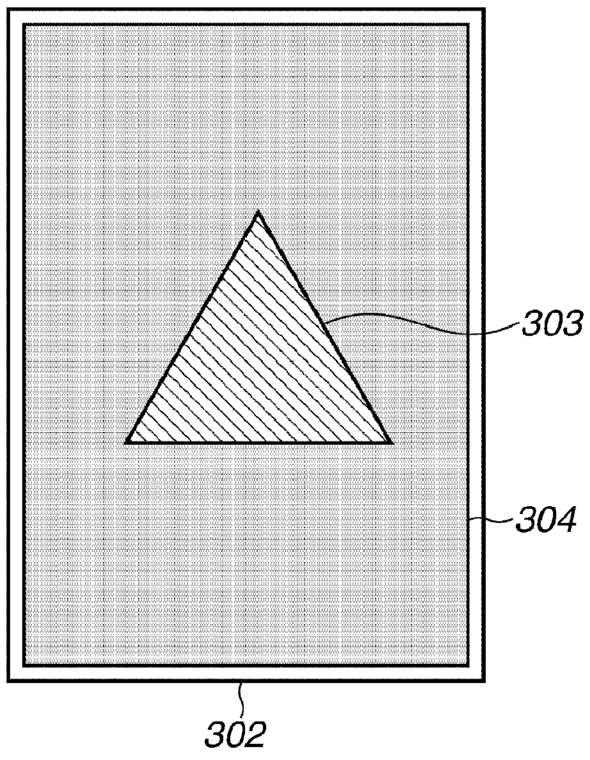

FIGS. 3A and 3B each illustrates an example of an image to be printed on which a 100% transparent toner has been applied to the object in which four colors of CMYK is used. As illustrated in FIG. 3A, an object 303 is drawn on a blank sheet 301. The following input values of the amount of applied toner of each of four colors of CMYK of the object 303 are applied:

C=60%

M=70%

Y=50%, and

K=60%.

The sum of the input values of the amount of applied toners of each of four colors of CMYK of the object 303 is 240% (the limit value 103). A surface of the sheet 302 illustrated in FIG. 3B indicates the state of the surface of the sheet obtained by applying a 100% transparent toner 304 on the entire surface thereof including the object 303.

In the case where the amount of applied toners of the five colors has been evenly decreased as illustrated in FIG. 1, the amount of applied toners of the four colors of CMYK on the object 303 decreases to a value of 192% (=240%−48%). In this case, the color is changed. In addition, the transparent toner also decreases in this case. More specifically, the amount of applied toner of the transparent toner decreases to a density of 48%. Thus, in this case, only a far less amount of gloss than the desired gloss can be obtained. Furthermore, when the amount of applied toners of the five colors is decreased while maintaining the amount of applied toners of the four colors of CMYK, as illustrated in FIG. 2, the density of the object 303 is maintained.

However, the amount of applied toner of the transparent toner 304 is decreased down to the density of 0% because the input value of the amount of applied toners of the four colors of CMYK on the object 303 is the limit value 103 (=240%). As a result, the gloss by the transparent toner is not obtained at all.

On the other hand, the limit value 103 of the above-described total amount of applied toners is the value uniquely set for a printing apparatus. Accordingly, if the user does not recognize the limit value 103, it is extremely difficult for a user to prevent the decrease of the gloss, which occurs against the user's intention, for example, by editing original data.

Figure 4:
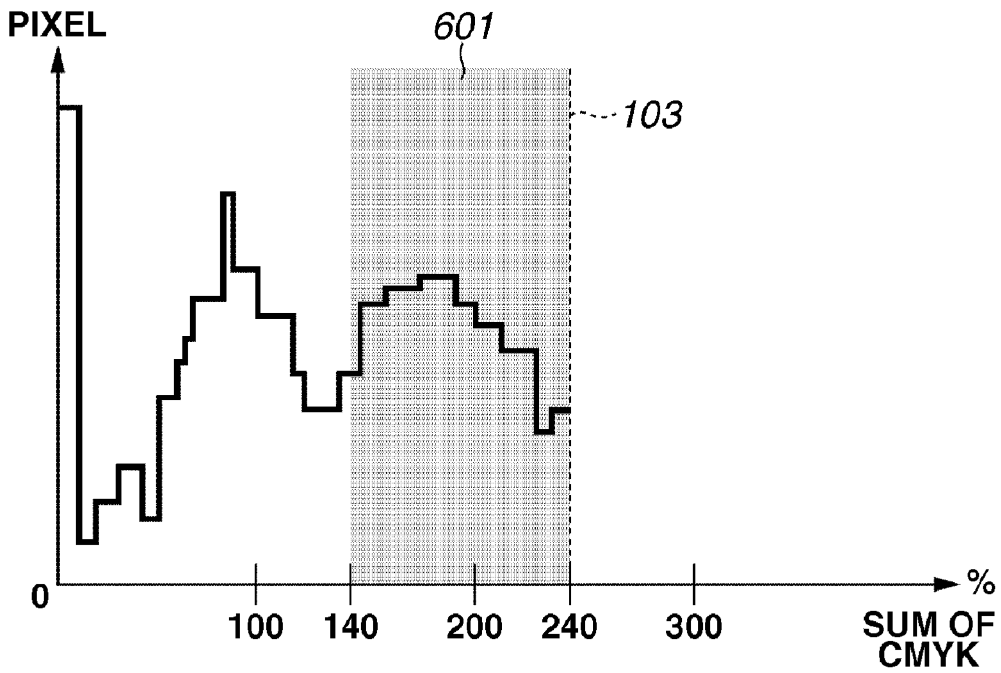
FIG. 4 illustrates an example of a histogram indicating the sum of density values of the four colors of CMYK for each pixel of input data according to a premise of exemplary embodiments of the present invention.

FIG. 4 illustrates example of a histogram illustrating the sum of density values (signal values such as pixel values) of the four colors of CMYK in each pixel of input data. The density of four colors of CMYK of each pixel of input data is a relative value indicated in percentage.

Referring to the histogram in FIG. 4, it can be recognized that no pixel having the value exceeding the limit value 103, which is the limit value of the amount of applied toner, exists. Here, the desired gloss is not obtained with respect to the pixels, which is included in the area from the limit value 103 to the value calculated by decreasing the limit value 103 by 100% (an area 601 in which the total sum of the amount of applied toners of the four colors of CMYK ranges from 140% to 240%). This is because the density of the color toners decreases by decreasing the amount of the transparent toner and the amount of the color toners together as described above. Accordingly, as the number of pixels in the area 601 increases, it becomes more difficult to obtain the gloss desired by the user even if the transparent toner is applied.

Figure 5:
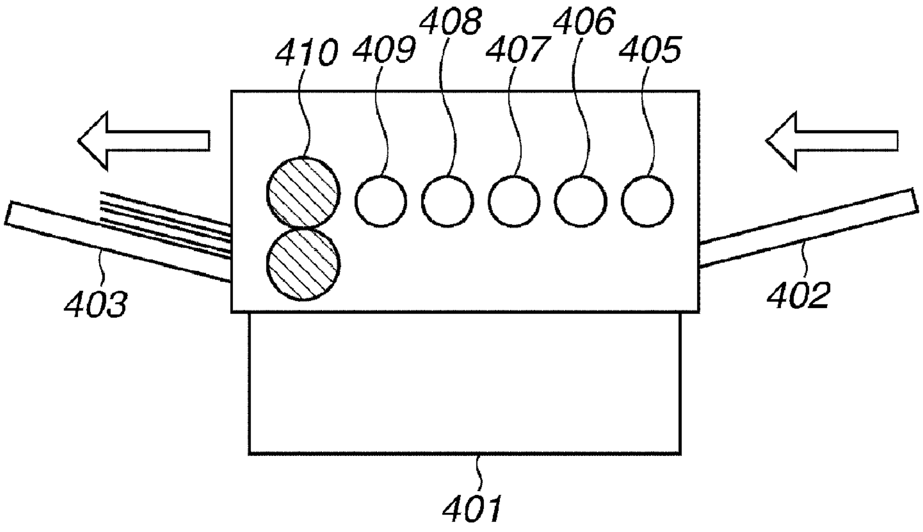
FIG. 5 illustrates an exemplary configuration of a printing apparatus that is capable of applying a transparent toner.

FIG. 5 illustrates an exemplary configuration of a printing apparatus that is capable of applying a transparent toner. Referring to FIG. 5, a printing apparatus 401, which is capable of applying a transparent toner, feeds a sheet from a paper feed stage 402. The printing apparatus 401 includes development stations 405 through 409.

More specifically, the station 405 for cyan (C), the station 406 for magenta (M), the station 407 for yellow (Y), the station 408 for black (K), and a station 409 for applying the transparent toner are installed in the printing apparatus 401. After the toners have been developed on the surface of the sheet by the stations 405 through 409, and are fixed by a fixing device 410, the sheet is discharged on a paper discharge stage 403.

The above-described problem that the density of the transparent toner on the object 303 decreases can be solved by performing the processing twice on one sheet in the printing apparatus 401. In the following description, the mode for performing the processing in the above-described manner is referred to as a "transparent toner twice-fixing mode" when necessary.

Figure 6:
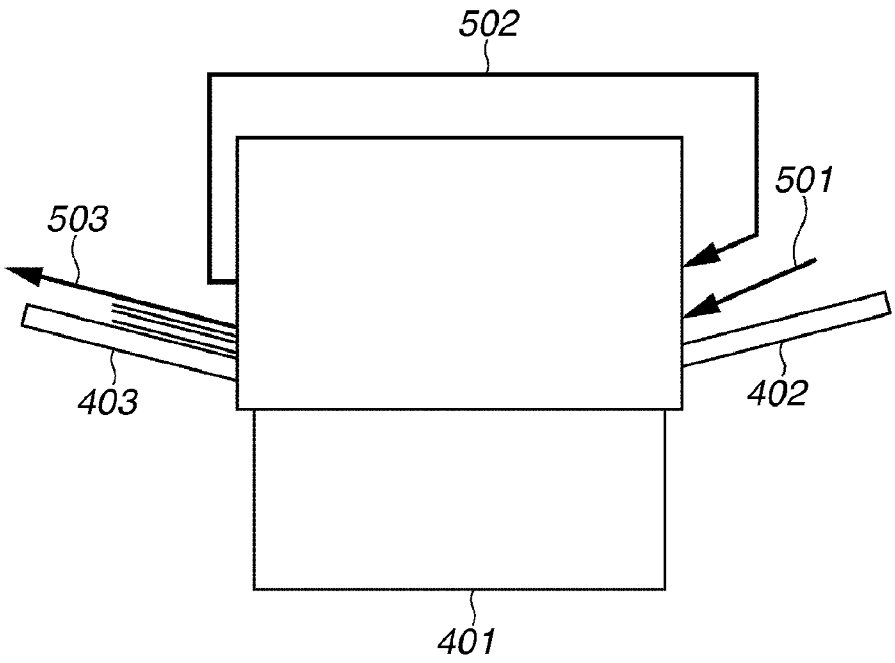
FIG. 6 illustrates an example of processing executed when the printing apparatus performs a transparent toner twice-fixing mode according to an exemplary embodiment of the present invention.

FIG. 6 illustrates an example of processing executed by the printing apparatus 401 in the case of performing the transparent toner twice-fixing mode. Referring to FIG. 6, in processing 501, the user feeds a sheet having no image printed thereon on the paper feed stage 402. The printing apparatus 401 develops each of the CMYK toners by using the toners of four colors of CMYK while restricting the amount of applied toners in the above-described manner. Then, the printing apparatus 401 uses the fixing device 410 to fix the toners on the surface of the sheet. Then, the sheet is discharged on the paper discharge stage 403.

In processing 502, the user sets (feeds) the printed sheet, which has been discharged on the paper discharge stage 403, on the paper feed stage 402 again. In this case, the printing apparatus 401 applies only the transparent toner to the sheet, which is set (fed) again, by using the fixing device 410. Then, the sheet is discharged on the paper discharge stage 403. Accordingly, the user can obtain a print result on which the transparent toner has been applied on the entire surface thereof in processing 503.

However, in the case of executing the print processing in the transparent toner twice-fixing mode, it is necessary for the user to set the printed paper sheet on the paper feed stage 402 again by hand. Furthermore, in setting the sheet in the above-described manner, it is also necessary for the user to deliberately set the sheet so that the sheet is set on the right side and inserted in the appropriate orientation in order to prevent obtaining an undesired print result or to prevent executing the processing again from the processing 501.

Accordingly, in the case where the print processing is performed in the transparent toner twice-fixing mode, the waste of both time and sheets may arise. In addition, the sheet that has once passed through the fixing device 410 can be curled or contracted due to the heat applied thereby. Therefore, the problem such as paper jamming can easily arise during second print processing. In order to prevent such a problem, processing for cooling down the heated sheet for a predetermined wait time, for example, is necessary before setting the paper printed in the processing 502 on the paper feed stage 402 again.

As described above, in the transparent toner twice-fixing mode, problems can arise that the print processing time and the user's work can increase relative to the case in which the processing of five colors including the four colors of CMYK and the transparent toner is executed at a time in the transparent toner once-fixing mode.

A printing apparatus capable of increasing the gloss by adjusting the print processing of the color toners without using the transparent toner will be described in detail below. As an example of the method for adjusting the print processing, a method can be used in which fixing of the color toners of CMYK is performed slowly by controlling the fixing device 410 to decrease the processing speed.

Furthermore, it is also useful to use any other method capable of increasing the gloss without using the transparent toner. As the example of the other methods, a method can be used which adjusts the speed of development by a development device. In this case, an amount of toner larger than that in the case of a normal operation can be applied. As a result, the gloss can be increased.

The printing apparatus capable of operating in a gloss mode can be realized by removing the station 409 from the printing apparatus 401 illustrated in FIG. 5.

Now, an example of the operation executed by the printing apparatus in the gloss mode will be described in detail below with reference to FIG. 5.

When the operation is started, the toners of four colors of CMYK are developed on the surface of the sheet set (fed) on the paper feed stage 402 by using the stations 405 through 408, which correspond to the four colors of CMYK. As described above, the station 409 is not used in this case.

The fixing device 410 performs the fixing processing at the speed as low as one-third of that in normal print processing of the toners of four colors of CMYK that have been developed on the sheet. By performing the above-described processing, the more amount toners can be fused than the amount of toners fused in normal print processing. Thus, the gloss of the color toners can be increased.

Figure 7:
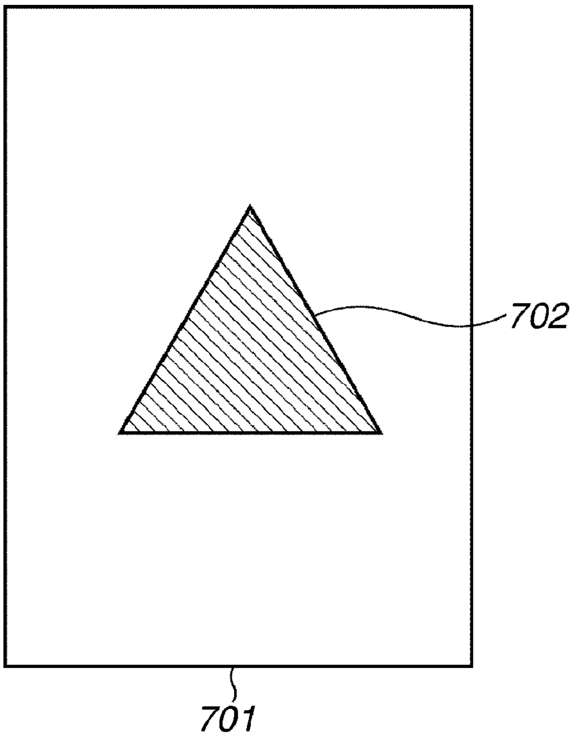
FIG. 7 illustrates an example of a print sheet on which an image has been printed in a gloss mode according to an exemplary embodiment of the present invention.

FIG. 7 illustrates an example of a sheet on which an image has been printed in the gloss mode. Referring to FIG. 7, an object 702 is drawn on a blank paper 701. When the printing apparatus 401 applies the gloss mode on data to be printed, the gloss of only the object 702 is increased. On the other hand, it is difficult to increase the gloss of the area of the sheet other than the area on which the object 702 exists even if the gloss mode is applied repeatedly. Accordingly, in this case, it is extremely difficult to increase the gloss in the case of printing image data that includes many white areas or many color areas whose density of the CMYK toners is low (highlight color).

The printing apparatus including both the above-described transparent toner mode and the gloss mode is useful. As described above, in the case of using the transparent toner, the desired gloss may not be achieved due to the restriction of the amount of applied toners. On the other hand, in the gloss mode, it is difficult to apply gloss on the white portions and the highlight color portions of the sheet. Furthermore, in the case where the printing apparatus 401 is operated in the transparent toner twice-fixing mode to obtain gloss, the processing time and the amount of work by the user may considerably increase compared to the case of the transparent toner once-fixing mode and the gloss mode. In addition, it is very difficult for users to determine which mode among the gloss mode, the transparent toner once-fixing mode, and the transparent toner twice-fixing mode is most effective to obtain an optimum gloss.

More specifically, an optimum gloss can be obtained by using the transparent toner twice-fixing mode. However, in this mode, a long processing time and a relatively large amount of work are needed. Therefore, it is natural that the user selects a mode other than the transparent toner twice-fixing mode in order to execute the processing at an appropriately high speed. However, it is extremely difficult for the user to determine whether a sufficient gloss can be obtained by using the gloss mode or the transparent toner once-fixing mode by prioritizing the processing speed.

Accordingly, an appropriate gloss cannot be applied to the image to be printed by merely using the gloss mode and the transparent toner mode together. Now, each exemplary embodiment of the present invention will be described in detail below based on the above-described premises.

Now, a first exemplary embodiment of the present invention will be described in detail below. Here, the printing apparatus 401 described above with reference to FIG. 5 is used as a printing apparatus according to the present exemplary embodiment. As described above, the printing apparatus 401 includes the function for executing the gloss mode and the transparent toner once-fixing mode.

Now, control for applying the gloss to the entire surface of the sheet executed by the printing apparatus 401 will be described in detail below.

Figure 8:
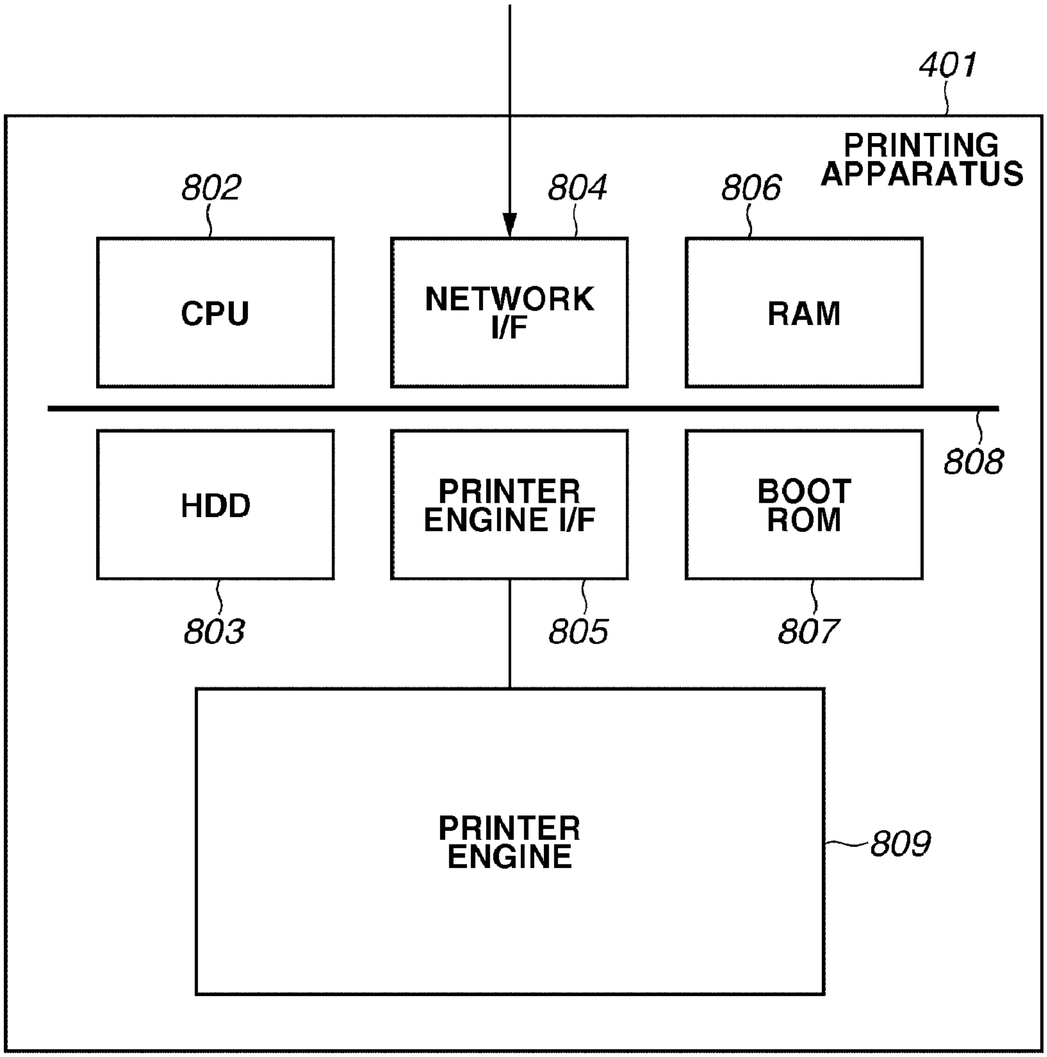
FIG. 8 illustrates an exemplary configuration of the printing apparatus according to a first exemplary embodiment of the present invention.

FIG. 8 illustrates an exemplary configuration of the printing apparatus 401 according to the present exemplary embodiment. Referring to FIG. 8, a central processing unit (CPU) 802 is connected to a system bus 808. The CPU 802 controls the following peripheral devices, which are connected to the bus 808, performs calculations therefor, and executes programs stored in a storage device. A network interface (I/F) 804 controls an input from an external network. A random access memory (RAM) 806 and a hard disk drive (HDD) 803 are the storage devices.

A boot read-only memory (ROM) 807 stores a program for executing boot processing. A printer engine I/F 805 controls a communication with a printer engine 809. For example, the printer engine 809 is an apparatus that develops a digital image on a surface of a physical sheet by using an electrophotographic printing method. The printer engine 809 includes the development stations 405 through 409 and the fixing device 410 illustrated in FIG. 4. The printing apparatus 401 is primarily constituted by the above-described components.

Figure 9:
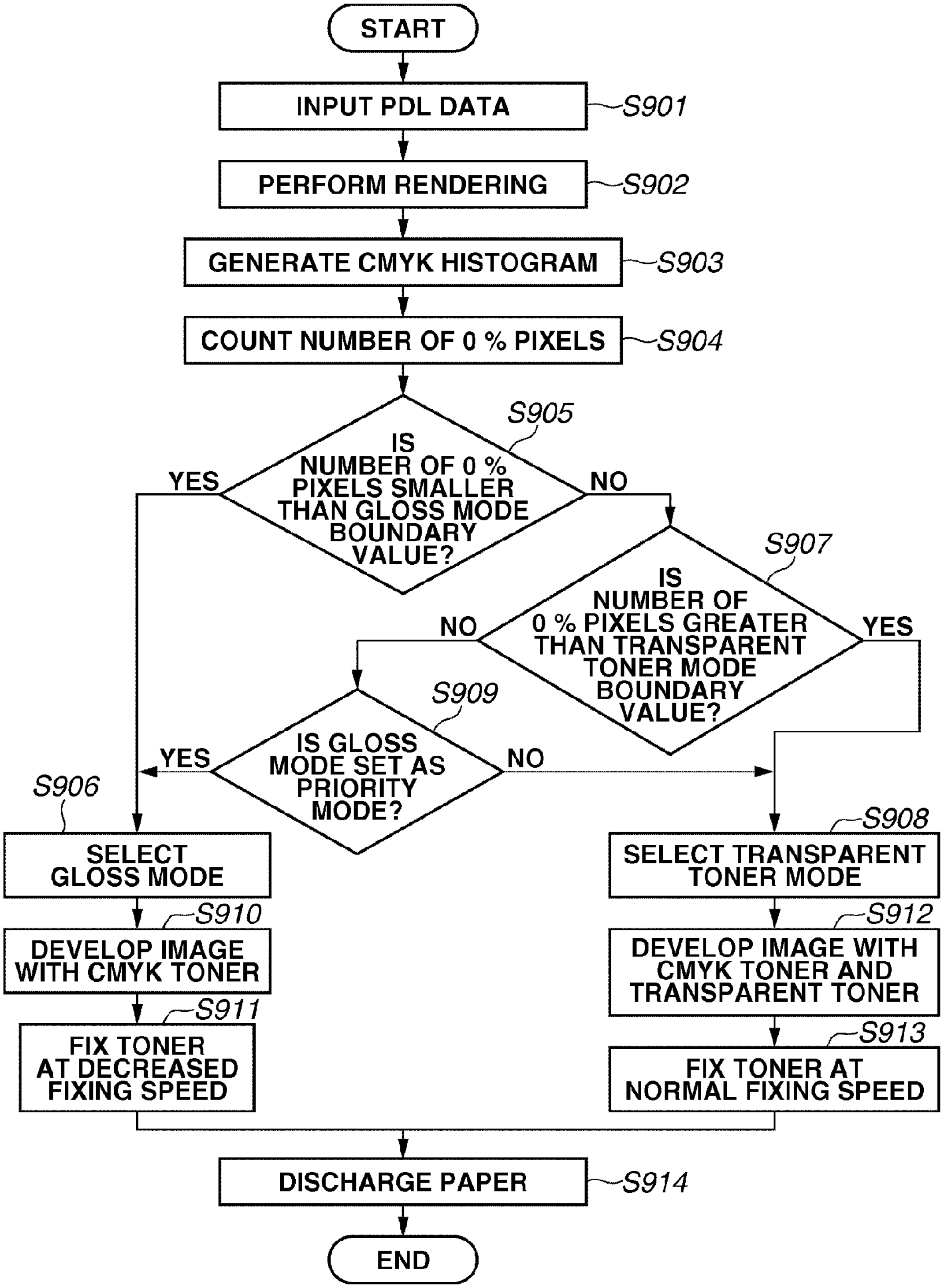
FIG. 9 is a flow chart illustrating exemplary processing executed by the printing apparatus according to the first exemplary embodiment of the present invention.

FIG. 9 is a flow chart illustrating exemplary processing executed by the printing apparatus 401 according to the present exemplary embodiment. Each step of exemplary embodiments is executed by the CPU 802 of the printing apparatus 401 unless otherwise described.

Referring to FIG. 9, in step S901, the network I/F 804 receives page description language (PDL) data from an external network. Thus, in the present exemplary embodiment, image data is realized by the PDL data, for example. Furthermore, an exemplary acquisition unit is realized by the processing in step S901.

In step S902, the CPU 802 analyzes the PDL data input in step 901 and converts the analyzed PDL data into contone data including a multivalued signal value of each of the four colors of CMYK. The processing is generally referred to as "rendering".

In step S903, the CPU 802 generates a CMYK histogram based on the signal values of pixels constituting the contone data converted in step S902.

Figure 10:
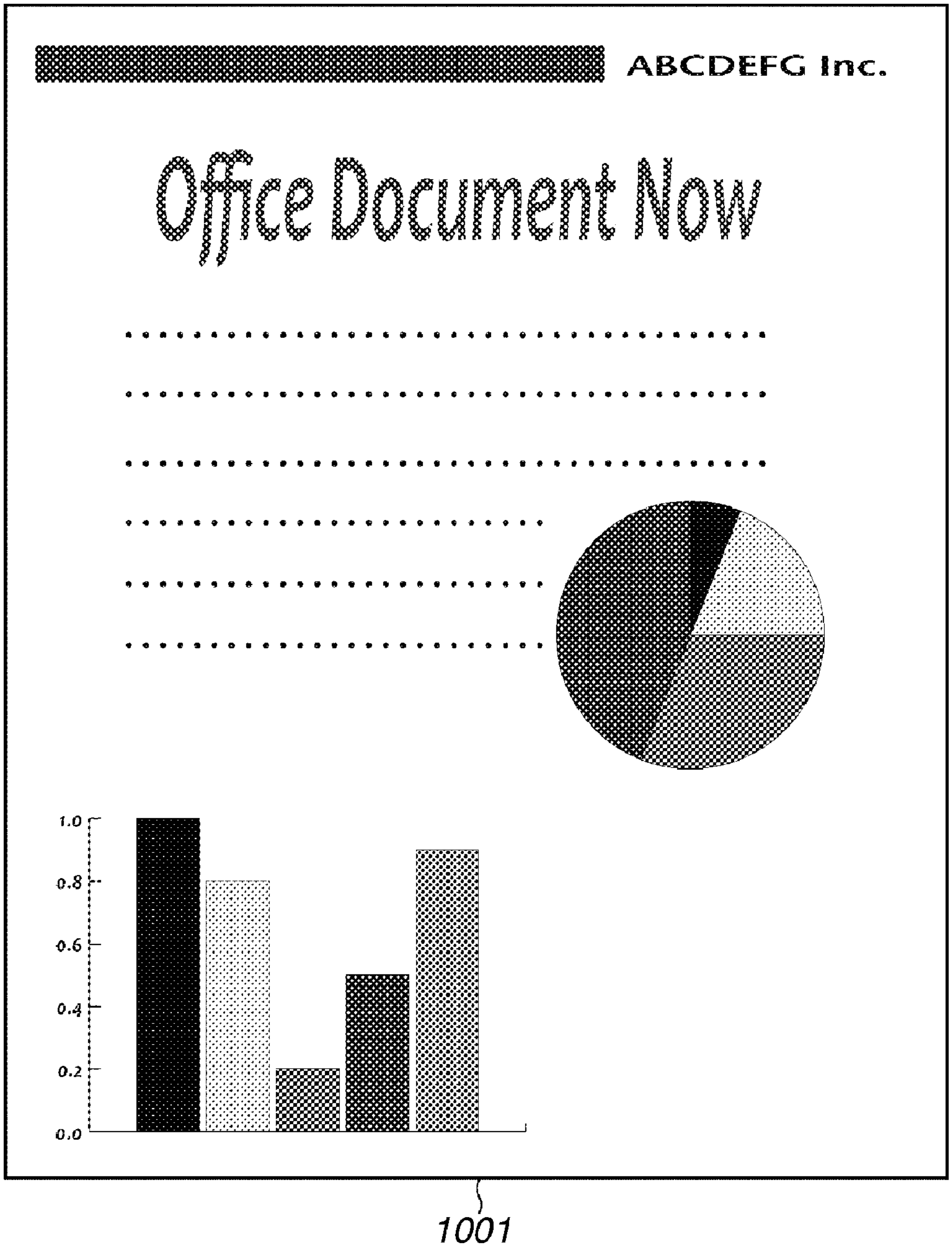
FIG. 10 illustrates a first example of print data (image) according to the first exemplary embodiment of the present invention.

FIG. 10 illustrates a first example of the print data (image) according to the present exemplary embodiment. In the example illustrated in FIG. 10, print data of a document generally used in a business office is described. Referring to FIG. 10, print data 1001 is color data.

As described above, the print data 1001 has been rendered in step S902 and has also been converted into CMYK multi-valued contone data. In many cases, print data generally used in business offices partially includes texts, graphics, and images on a blank white background area as the print data 1001 (FIG. 10).

Figure 11:
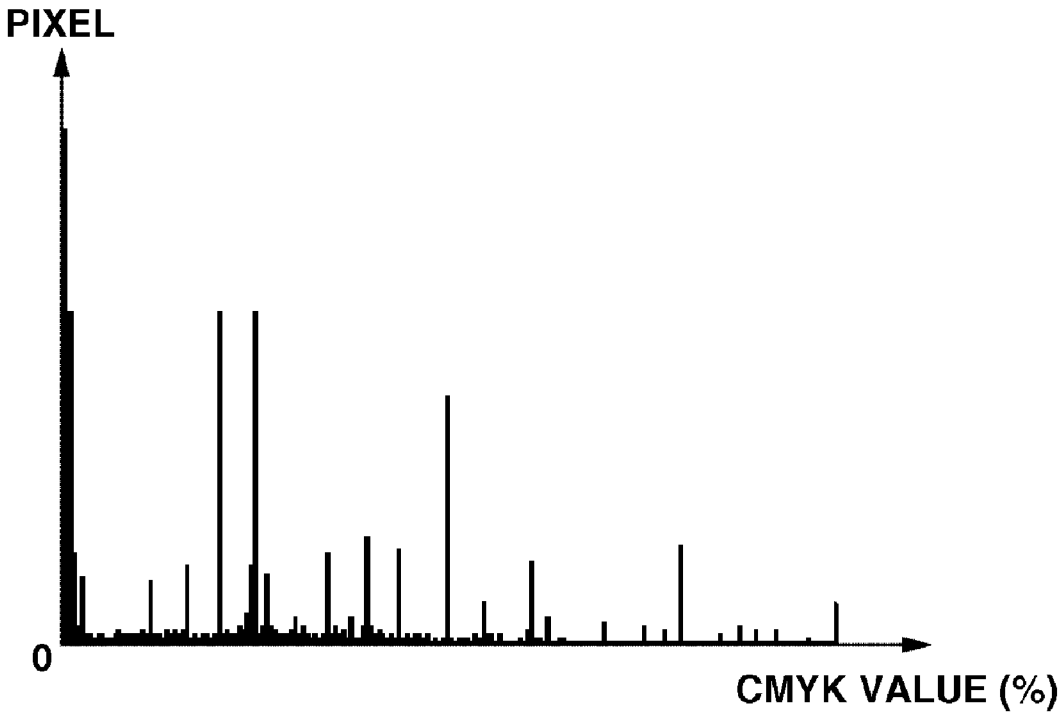
FIG. 11 illustrates an example of a histogram generated based on the print data illustrated in FIG. 10 according to the first exemplary embodiment of the present invention.

FIG. 11 illustrates an example of a histogram generated based on the print data 1001 illustrated in FIG. 10. As can be determined from the histogram illustrated in FIG. 11, the frequency of appearance of white pixels, whose sum of the density values (signal values) of the four colors of CMYK (CMYK value) is 0%, is highest and occupies the most part of the data.

Accordingly, most of the surface of the actual sheet is the blank white area in comparison with the area on which the toners have been applied. Furthermore, the CMYK values are discretely distributed.

Therefore, the gloss cannot be applied to the blank white area, which occupies the most part of the data, even if the user desires to apply the gloss by using the gloss mode on the data.

Accordingly, with respect to the print data 1001 (FIG. 10), the present exemplary embodiment can apply the gloss to the entire surface of the sheet by applying the transparent toner mode.

Figure 12:
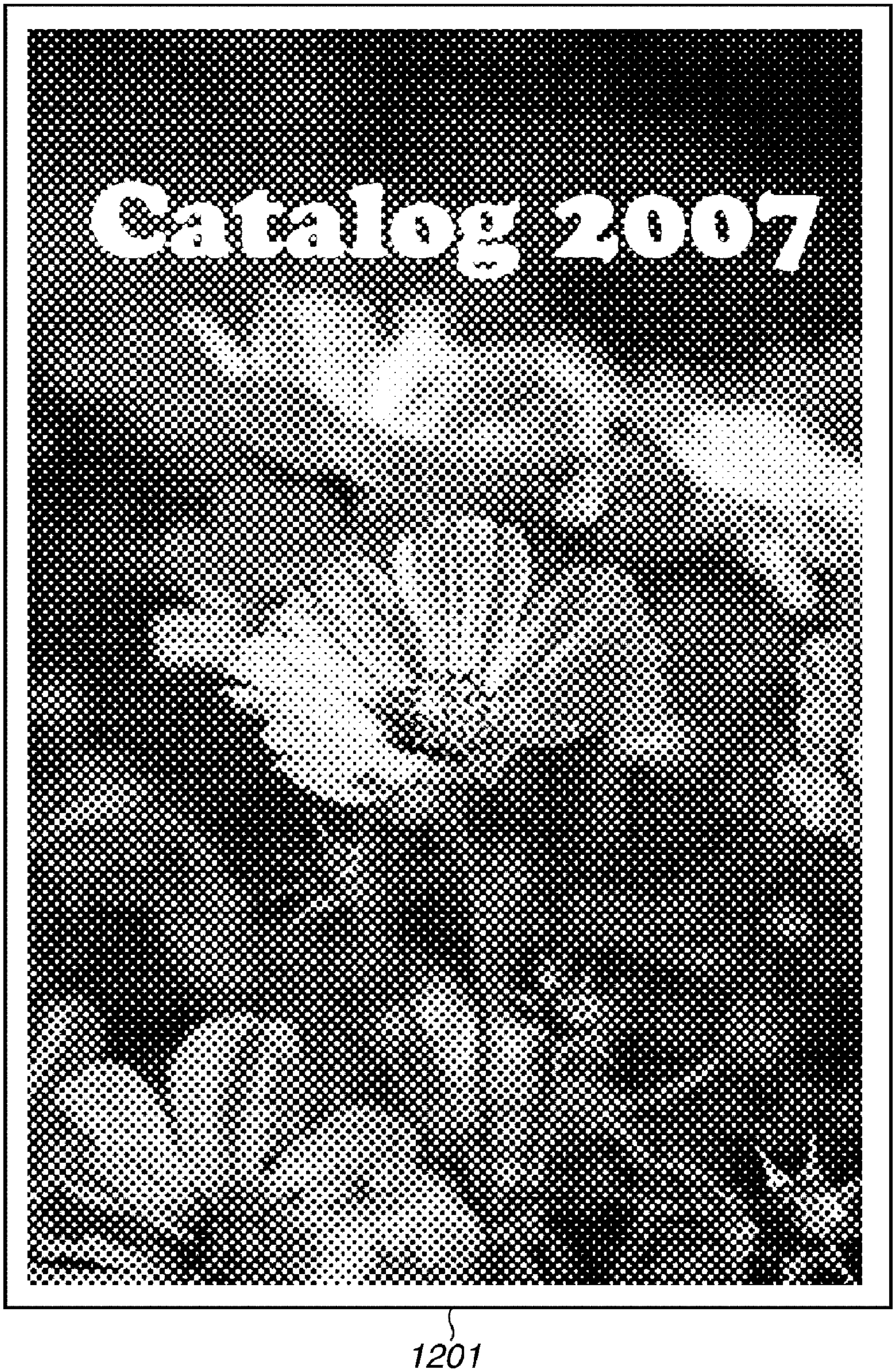
FIG. 12 illustrates a second example of print data (image) according to the first exemplary embodiment of the present invention.

FIG. 12 illustrates a second example of the print data (image). In the example illustrated in FIG. 12, print data of a document usually used in the graphic art market is described.

Referring to FIG. 12, print data 1201 is color data that has been rendered in step S902 and has been converted into CMYK multivalued contone data, similar to the print data 1001 illustrated in FIG. 10.

In the market of graphic art, a print sheet usually includes an image on its entire surface or may include texts and graphics of many various colors as in the case of a catalog of products.

Figure 13:
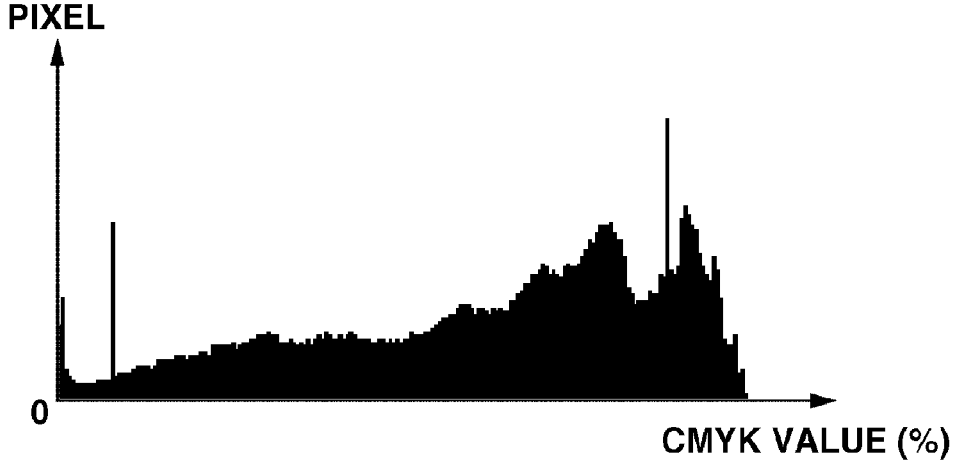
FIG. 13 illustrates an example of a histogram generated based on the print data illustrated in FIG. 12 according to the first exemplary embodiment of the present invention.

FIG. 13 illustrates an example of a histogram generated based on the print data illustrated in FIG. 12. The histogram illustrated in FIG. 13 is different from that illustrated in FIG. 11 in the point that the frequency of appearance of white pixels, whose CMYK value is 0%, is lower than that illustrated in FIG. 11. Accordingly, on the surface of an actual sheet, a most area thereof is applied with toners. Furthermore, the values of four colors of CMYK are continuously distributed.

Thus, the gloss can be applied to most of the surface by using the gloss mode to the above-described data. As described above, in the present exemplary embodiment, an exemplary generation unit is realized, for example, by executing the processing in step S903.

Returning to FIG. 9, after the histogram has been generated in the above-described manner in step S903, the processing advances to step S904. In step S904, the CPU 802 counts the number of 0% pixels (white pixels) according to the histogram generated in step S903.

Figure 14:
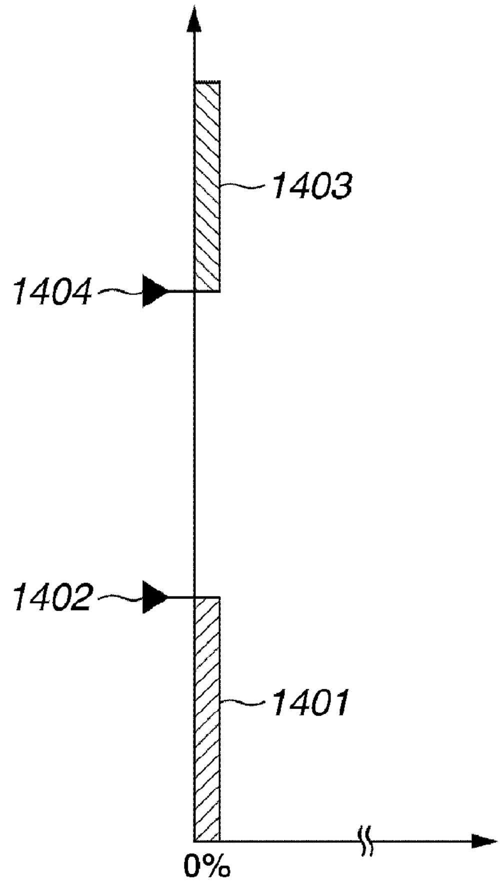
FIG. 14 illustrates a relationship of correspondence between a 0% pixel and a mode to be selected according to the first exemplary embodiment of the present invention.

FIG. 14 illustrates an example of a relationship of correspondence between the 0% pixels and the selected mode according to the present exemplary embodiment. Referring to FIG. 14, in an area 1403, in which the number of 0% pixels is large, the gloss can be applied to the entire surface of the sheet by using the transparent toner mode as described above. A transparent toner mode boundary value 1404 is a predetermined value stored, for example, on the HDD 803.

On the other hand, in the area 1401, in which the number of 0% pixels is smaller than that in the area 1403, the gloss can be applied to the entire surface of the sheet by using the gloss mode, as described above.

A gloss mode boundary value 1402 is also a predetermined value stored, for example, on the HDD 803, similar to the transparent toner mode boundary value 1404.

As described above, in the present exemplary embodiment, an exemplary derivation unit is realized, for example, by executing the processing in step S904.

Returning to FIG. 9, in step S905, the CPU 802 determines whether the number of 0% pixels counted in step S904 is smaller than the gloss mode boundary value 1402. If it is determined in step S905 that the number of 0% pixels counted in step S904 is smaller than the gloss mode boundary value 1402 (YES in step S905), then the processing proceeds to step S906. In step S906, the CPU 802 selects the gloss mode as the mode to be used for printing.

On the other hand, if it is determined in step S905 that the number of 0% pixels counted in step S904 is not smaller than the gloss mode boundary value 1402 (NO in step S905), then the processing proceeds to step S907.

In step 907, the CPU 802 determines whether the number of 0% pixels counted in step S904 is greater than the transparent toner mode boundary value 1404. If it is determined in step S907 that the number of 0% pixels counted in step S904 is greater than the transparent toner mode boundary value 1404 (YES in step S907), then the processing proceeds to step S908. In step S908, the CPU 802 selects the transparent toner mode as the mode to be used for printing.

On the other hand, if it is determined in step S907 that the number of 0% pixels counted in step S904 is equal to or smaller than the transparent toner mode boundary value 1404 (NO in step S907), then the processing proceeds to step S909.

In step S909, the CPU 802 determines which of the gloss mode and the transparent toner mode has been set as a priority mode. The content of the priority mode has been set by the user in advance and is stored, for example, on the HDD 803. If it is determined in step S909 that the gloss mode has been set as a priority mode (YES in step S909), then the processing proceeds to step S906. In step S906, the CPU 802 selects the gloss mode as the mode to be used for printing.

On the other hand, if it is determined in step S909 that the transparent toner mode has been set as a priority mode (NO in step S909), then the processing proceeds to step S908. In step S908, the CPU 802 selects the transparent toner mode as the mode to be used for printing.

As described above, in the present exemplary embodiment, a first threshold corresponds to the gloss mode boundary value 1402, for example. Furthermore, a second threshold corresponds to the transparent toner mode boundary value 1404. Moreover, an exemplary comparison unit is realized by executing the processing in steps S905 and S907.

Furthermore, an example of a selection unit in the case where the number of 0% pixels is smaller than the first threshold value is realized, for example, by executing the processing in step S906. In addition, an example of the selection unit in the case where the number of 0% pixels is greater than the second threshold value is realized by executing the processing in step S908, for example.

Furthermore, an example of the selection unit in the case where the number of 0% pixels is equal to or greater than the first threshold value and equal to or smaller than the second threshold value is realized, for example, by executing the processing in steps S906, S908, and S909.

After the gloss mode has been selected in step S906, the processing proceeds to step S910. In step S910, the printer engine 809 performs development on the surface of the sheet with the CMYK toners without using the transparent toner. In step S911, the printer engine 809 slowly fixes the CMYK toners, which is developed in step S906, at a speed slower than that in the case of normal fixing speed. Thus, the present exemplary embodiment can apply the gloss on the CMYK toners. After the CMYK toners are fixed in the above-described manner, the processing proceeds to step S914. In step S914, the printer engine 809 discharges the sheet on which the gloss has been applied and fixed. Then, the processing executed according to the flow chart in FIG. 9 ends.

When the transparent toner mode is selected in step S908, the processing proceeds to step S912. In step S912, the printer engine 809 performs development on the surface of the sheet using both the CMYK toners and the transparent toner.

In step S913, the printer engine 809 can apply the gloss, in which the transparent toner is applied on the entire surface of the sheet, by fixing the developed CMYK toners and the transparent toner at the normal print speed.

After the CMYK toners and the transparent toner are fixed in the above-described manner, the processing proceeds to step S914. In step S914, the printer engine 809 discharges the sheet on which the CMYK toners and the transparent toner are fixed. Then, the processing executed according to the flow chart in FIG. 9 ends.

As described above, in the present exemplary embodiment, an example of a generation unit is realized, for example, by executing the processing in steps S910 through S913.

As described above, in the present exemplary embodiment, in the case where the frequency of appearance of the white pixels, whose CMYK value is 0%, is equal to or smaller than the gloss mode boundary value 1402, the developed CMYK toners are slowly fixed at a speed slower than the normal speed to apply the gloss to the CMYK toners. On the other hand, if it is determined that the frequency of appearance of the white pixels is equal to or greater than the transparent toner mode boundary value 1404, the present exemplary embodiment applies the gloss on the entire surface of the sheet by using the transparent toner. As described above, the present exemplary embodiment, using the histogram, counts the number of times of appearance of the pixels whose gloss cannot be easily reproduced. Then, the present exemplary embodiment automatically selects each mode based the result of the counting.

By performing the above-described processing, the present exemplary embodiment can appropriately and automatically change the modes between the gloss mode and the transparent toner mode according to the attribute of the input print data 1001 and 1201 without requiring the user to analyze the print data. Thus, the present exemplary embodiment can apply the appropriate gloss to the image to be printed.

Furthermore, in the present exemplary embodiment, the gloss is applied in the mode, which is set in advance by the user as the priority mode, when the frequency of appearance (the number of times of appearance) of the white pixels is greater than the gloss mode boundary value 1402 and smaller than the transparent toner mode boundary value 1404. Accordingly, the present exemplary embodiment can surely execute either one of the gloss mode and the transparent toner mode.

That is, in the present exemplary embodiment, the printing apparatus 401 identifies the area in which no recording material such as a toner and an ink has been applied. Thereby, the present exemplary embodiment executes the print processing by using the transparent toner mode or the gloss mode.

Note that in the present exemplary embodiment, two values, such as the gloss mode boundary value 1402 and the transparent toner mode boundary value 1404 are used as the threshold values (the predetermined conditions) for selecting the mode to be used for printing. However, the present exemplary embodiment is not limited to this. For example, it is also useful if only one threshold value is used to select the mode to be used for printing. In this case, the gloss mode is used if the frequency of appearance of the white pixels is smaller than the threshold value while the transparent toner mode is used if the frequency of appearance of the white pixels is not smaller than the threshold value.

Next, a second exemplary embodiment of the present invention will be described in detail below. In the above-described first exemplary embodiment, the print mode is automatically changed between the gloss mode and the transparent toner mode based on the frequency of appearance of the 0% pixels by focusing on the number of 0% pixels in the histogram.

However, the effect achieved by the gloss mode may not be obtained with respect to the pixels, whose sum of CMYK toner values is not 0% but the amount of applied toner thereof is small. In order to address this problem, the present exemplary embodiment changes the print modes between the gloss mode and the transparent toner mode by considering the frequency of appearance of highlight color pixels whose sum of CMYK values is equal to or smaller than a threshold value.

Thus, the present exemplary embodiment is primarily different from the above-described first exemplary embodiment in a part of the processing for changing modes between the gloss mode and the transparent toner mode. Therefore, in the following description of the present exemplary embodiment, units and components that are the same as those in the first exemplary embodiment are denoted by the same reference numerals and symbols as in FIGS. 1 through 14. Accordingly, the detailed description thereof will not be repeated here. The differences between the embodiments are addressed in detail below.

Figure 15:
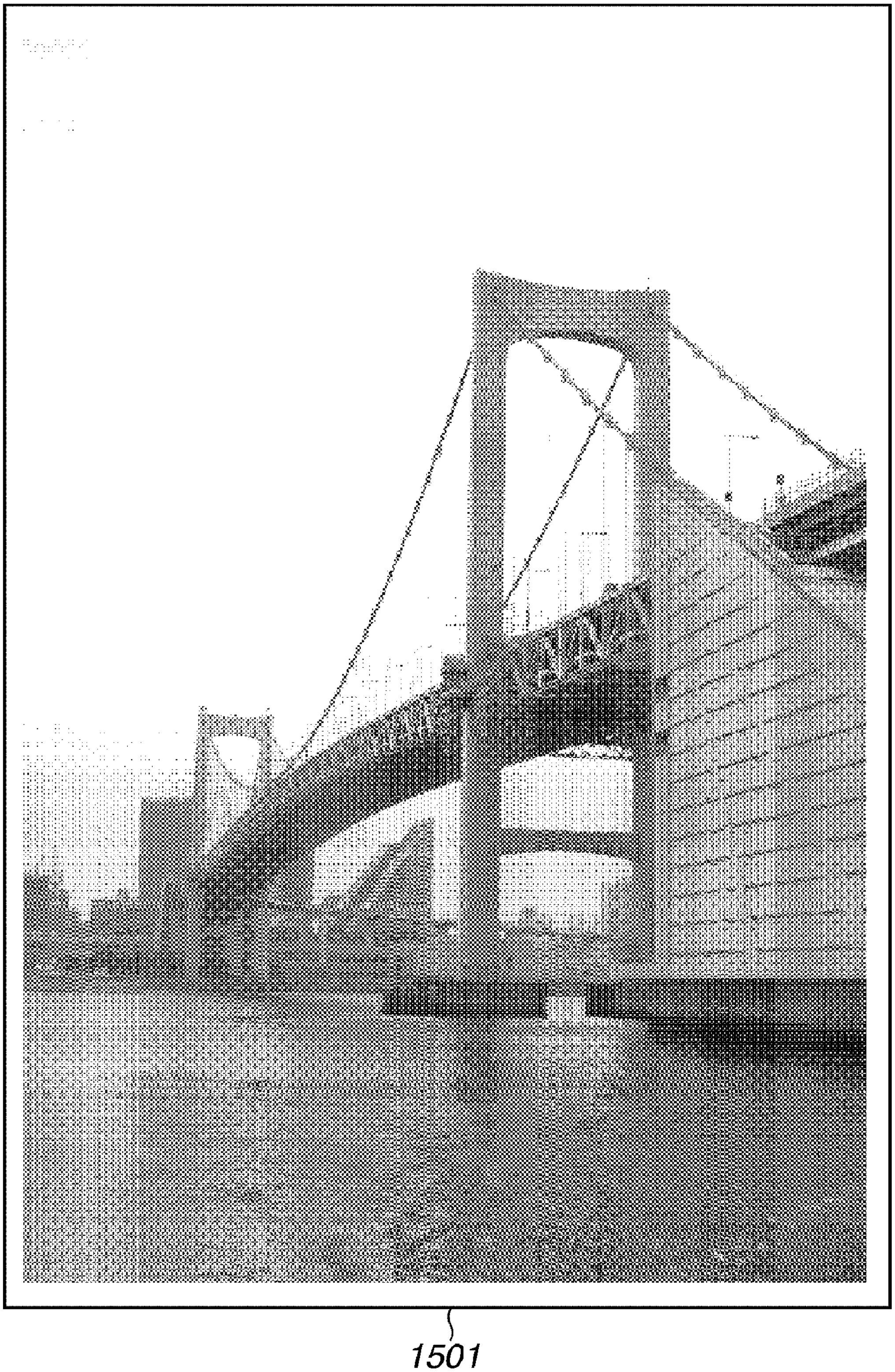
FIG. 15 illustrates an example of print data (image) according to a second exemplary embodiment of the present invention.

FIG. 15 is an example of print data (image) according to the present exemplary embodiment. In the example illustrated in FIG. 15, print data of an image, a most part of which has been developed with highlight colors, is illustrated.

Referring to FIG. 15, print data 1501 includes a photograph on its entire portion. In the image, the color of the sky is depicted by a tint color not by a pure white. More specifically, the CMYK signal values in this case are as follows:

C=1%
M=0%
Y=0%, and
K=1%.

The tint color like this is generally called a “highlight color”. A most area of the print data 1501 illustrated in FIG. 15 is depicted by the highlight colors.

Figure 16:
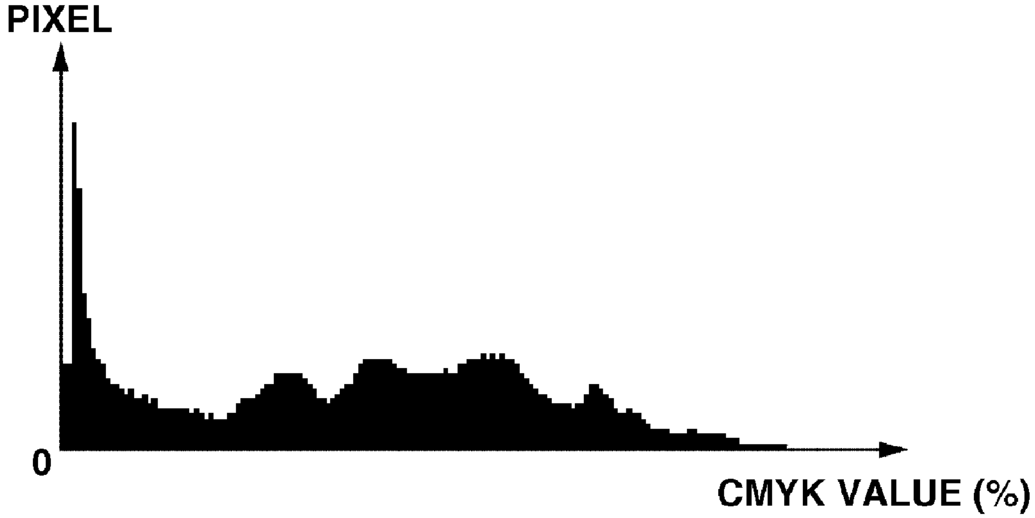
FIG. 16 illustrates an example of a histogram generated based on the print data illustrated in FIG. 15 according to the second exemplary embodiment of the present invention.

FIG. 16 illustrates an example of a histogram generated based on the print data 1501 illustrated in FIG. 15. As can be known from the histogram illustrated in FIG. 16, the number of pixels having CMYK values ranging from 1% to several percent is greater than the number of 0% pixels indicating the color of pure white. In the first exemplary embodiment, the gloss mode is selected because only the number of 0% pixels is focused even when the histogram is as illustrated in FIG. 16. As a result, the gloss of the area having the color of the sky in the print data 1501 is believed not to be achieved as effectively as in the present embodiment.

Figure 17:
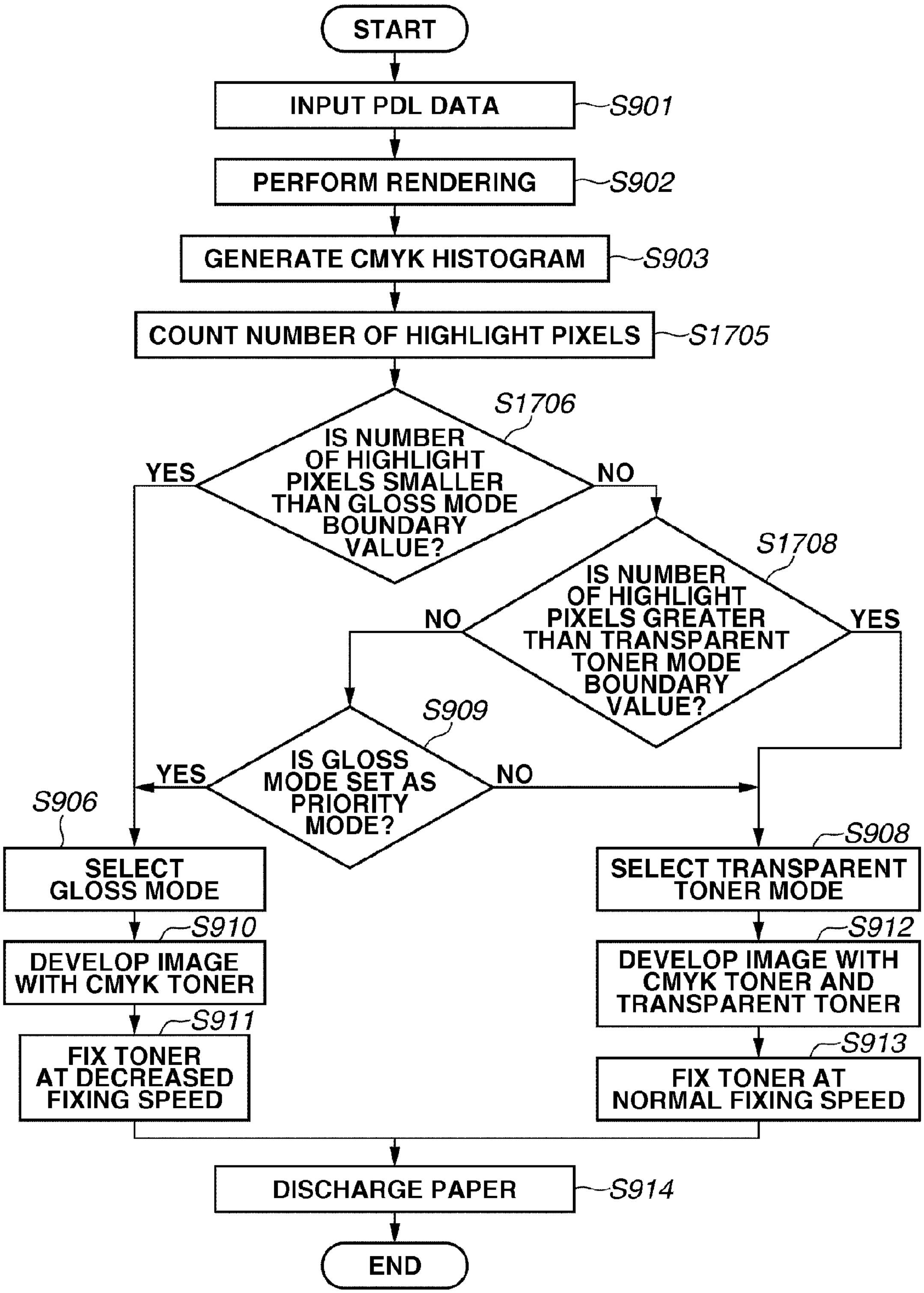
FIG. 17 is a flow chart illustrating exemplary processing executed by a printing apparatus according to the second exemplary embodiment of the present invention.

FIG. 17 is a flow chart illustrating exemplary processing executed by a printing apparatus 401 according to the present exemplary embodiment. Referring to FIG. 17, in steps S901 through S903, the CPU 802 executes the same processing as that performed in the first exemplary embodiment (see FIG.

9). In step S1705, the CPU 802 counts the number of highlight pixels according to the histogram generated in step S903, differently from the first exemplary embodiment. The CPU 802 determines that the pixel is a highlight pixel if it is determined in step S1705 that the sum of the signal values, such as the density of four colors of CMYK (the pixel value), of a specific pixel is equal to or smaller than a predetermined boundary value (equal to or greater than 0 and equal to or smaller than a signal upper limit value). In the above-described example (C=1%, M=0%, Y=0%, and K=1%), the total sum of the density values (the signal values) of four colors of CMYK is 2%.

Thus, when the boundary value for determining whether a pixel is a highlight pixel is 10%, the CPU 802 determines that the pixel is a highlight pixel (a highlight color) in step S1705.

As described above, in the present exemplary embodiment, for example, a signal upper limit value is realized by the boundary value. Furthermore, an exemplary derivation unit is realized by the processing executed in the processing in step S1705.

In step S1706, the CPU 802 determines whether the number of highlight pixels counted in step S1705 is smaller than the gloss mode boundary value 1402 stored on the HDD 803 in advance. If it is determined in step S1706 that the number of highlight pixels counted in step S1705 is smaller than the gloss mode boundary value 1402 (YES in step S1706), in which case the white and highlight color area on the sheet surface is small, the CPU 802 determines that the gloss can be obtained on the entire surface of the sheet in the gloss mode. Then, the processing proceeds to step S906. In step S906, the CPU 802 selects the gloss mode as the mode to be used for printing.

On the other hand, if it is determined in step S1706 that the number of highlight pixels counted in step S1705 is equal to or greater than the gloss mode boundary value 1402 stored in advance on the HDD 803 (NO in step S1706), then the processing proceeds to step S1708.

In step S1708, the CPU 802 determines whether the number of highlight pixels counted in step S1705 is greater than the transparent toner mode boundary value 1404 stored in advance on the HDD 803. If it is determined in step S1708 that the number of highlight pixels counted in step S1705 is greater than the transparent toner mode boundary value 1404 (YES in step S1708), in which case a most area on the sheet surface has white and highlight colors, then the CPU 802 determines that it is necessary to apply the transparent toner mode. Then, the processing proceeds to step S908. In step S908, the CPU 802 selects the transparent toner mode as the mode to be used for printing.

On the other hand, if it is determined in step S1708 that the number of highlight pixels counted in step S1705 is equal to or smaller than the transparent toner mode boundary value 1404 (NO in step S1708), then the processing proceeds to step S909.

In step S909, the CPU 802 determines which of the gloss mode and the transparent toner mode is set as the priority mode, as in the first exemplary embodiment.

If it is determined in step S909 that the gloss mode is set as the priority mode (YES in step S909), then the processing proceeds to step S906.

In step S906, the CPU 802 selects the gloss mode. On the other hand, if it is determined in step S909 that the transparent toner mode is set as the priority mode (NO in step S909), then the processing proceeds to step S908. In step S908, the CPU 802 selects the transparent toner mode.

After the mode to be used for printing has been selected in the above-described manner, the present exemplary embodiment can execute the printing for applying the gloss to the entire sheet surface as in the first exemplary embodiment by executing the processing based on the selected mode (steps S910 through S914).

As described above, in the present exemplary embodiment, a first threshold value is realized, for example, by the gloss mode boundary value 1402, while a second threshold value is realized, for example, by the transparent toner mode boundary value 1404. Furthermore, an exemplary comparison unit is realized by executing the processing in steps S1706 and S1708.

As described above, in the present exemplary embodiment, the mode can be selected between the gloss mode and the transparent toner mode by considering the frequency of appearance (the number of times of appearance) of the highlight color as well as considering the frequency of appearance of white pixels.

Therefore, the present exemplary embodiment can achieve the effect of preventing the failure of the gloss mode occurring due to the reduced amount of the applied toners, in addition to the effect described above in the above-described first exemplary embodiment.

In the present exemplary embodiment, the modification described in the first exemplary embodiment can be employed.

Now, a third exemplary embodiment of the present invention will be described in detail below. In the second exemplary embodiment described above, the number of white pixels and that of highlight pixels are counted and the result of the counting is used to select an appropriate mode. Furthermore, in the second exemplary embodiment, if the frequency of appearance (the number of times of appearance) of highlight pixels is equal to or greater than the gloss mode boundary value 1402 and is equal to or smaller than the transparent toner mode boundary value 1404, the mode is selected according to the predetermined priority mode.

However, even if the transparent toner mode is applied according to the priority mode as described above, the following situation may arise.

That is, the gloss desired by the user may not be obtained at pixels in the area 601 (see FIG. 4). In this regard, the present exemplary embodiment automatically changes modes between the gloss mode and the transparent toner mode by considering the frequency of appearance of the pixels in the area 601. The present exemplary embodiment is primarily different from the above-described second exemplary embodiment in only a part of the processing for changing modes between the gloss mode and the transparent toner mode.

Accordingly, in the following description of the present exemplary embodiment, units and components that are the same as those in the first and the second exemplary embodiments are denoted by the same reference numerals and symbols as in FIGS. 1 through 17. Accordingly, the detailed description thereof will not be repeated here. The differences between the embodiments are addressed in detail below.

Figure 18:
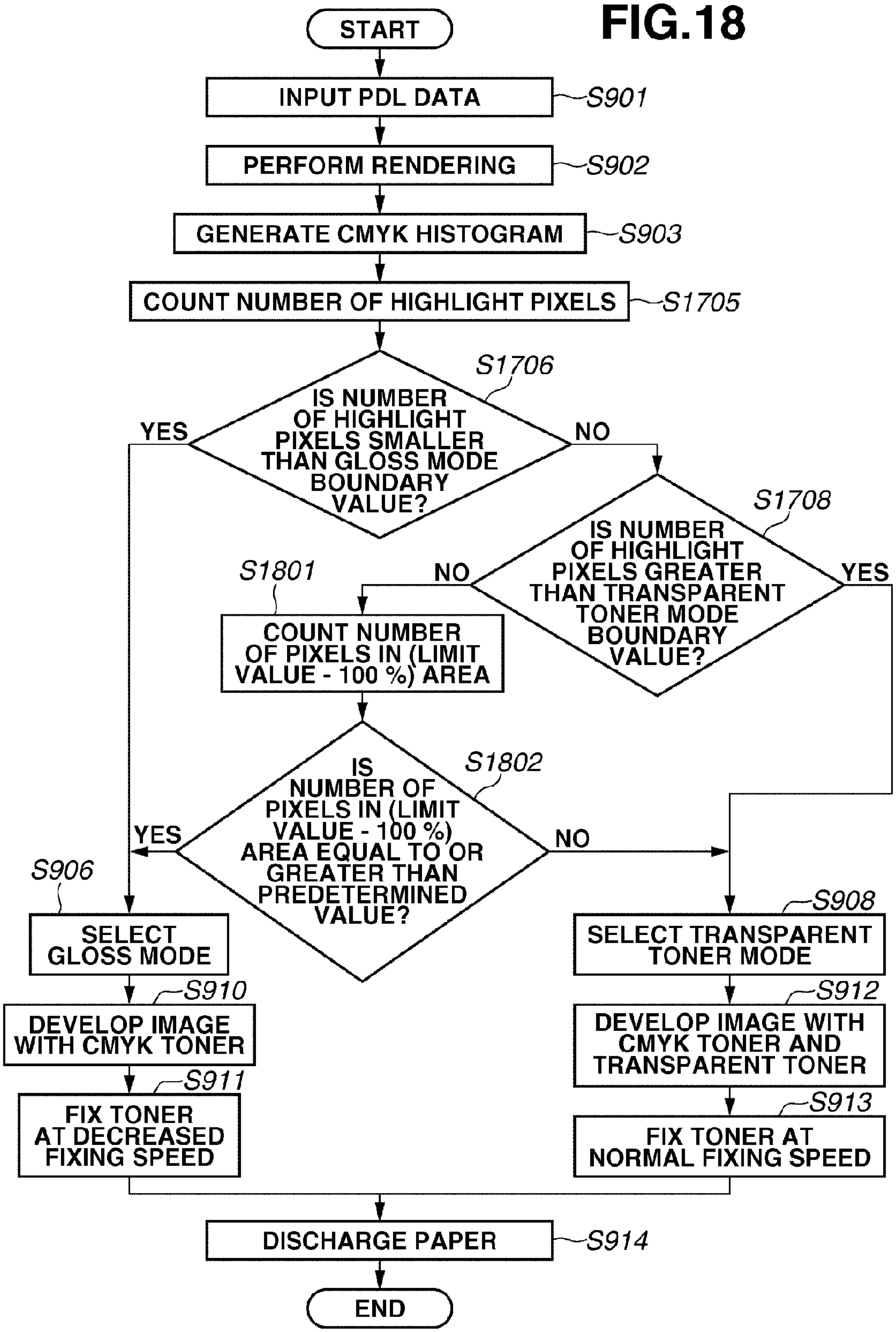
FIG. 18 is a flow chart illustrating exemplary processing executed by a printing apparatus according to a third exemplary embodiment of the present invention.

FIG. 18 is a flow chart illustrating exemplary processing executed by a printing apparatus 401 according to the present exemplary embodiment. Referring to FIG. 18, in steps S901 through S903 (see FIG. 9), the CPU 802 executes the same processing as that performed in the flow chart in the above-described first exemplary embodiment. In addition, in steps S1705, S1706, and S1708 (see FIG. 17), the CPU 802 executes the same processing as that performed in the second exemplary embodiment.

In step S1705, the CPU 802 counts the number of highlight pixels. In step S1706, the CPU 802 determines whether to select the gloss mode as the mode to be used for printing. In step S1708, the CPU 802 determines whether to select the transparent toner mode as the mode to be used for printing. If neither of the modes is selected as the mode to be used for printing in steps S1706 and S1708, then the processing proceeds to step S1801.

In step S1801, the CPU 802 counts the number of pixels included in the area from the value, which is smaller than the limit value 103 for restricting the amount of applied toner by 100%, to the toner application amount limit value 103 (i.e., within the area 601) based on the histogram generated in step S903.

As described above, in the present exemplary embodiment, an exemplary first derivation unit is realized, for example, by executing the processing in step S1705. Furthermore, an exemplary second derivation unit is realized, for example, by executing the processing in step S1801.

In step S1802, the CPU 802 determines whether the "number of pixels in the area 601" counted in step S1801 is equal to or greater than a predetermined value. The predetermined value is stored, for example, on the HDD 803.

If it is determined in step S1802 that the "number of pixels in the area 601" counted in step S1801 is equal to or greater than the predetermined value (YES in step S1802), in which case the CPU 802 determines that the gloss desired by the user cannot be reproduced even if the transparent toner is applied thereon, due to the restriction on the amount of applied toner, then the processing proceeds to step S906. In step S906, the CPU 802 selects the gloss mode as the mode to be used for printing.

On the other hand, if it is determined in step S1802 that the "number of pixels in the area 601" counted in step S1801 is smaller than the specific predetermined value (NO in step S1802), in which case the CPU 802 determines that the desired gloss cannot be reproduced due to the restriction on the amount of applied toner only in a small area, then the processing proceeds to step S908. In step S908, the CPU 802 selects the transparent toner mode as the mode to be used for printing.

After the mode to be used for printing is selected in the above-described manner, the printing by applying the gloss on the entire surface of the sheet (steps S910 through S914) can be executed by performing the processing according to the selected mode as performed in the first exemplary embodiment.

As described above, in the present exemplary embodiment, an exemplary first comparison unit is realized, for example, by executing the processing in steps S1706 and S1708. Furthermore, an exemplary second comparison unit is realized, for example by executing the processing in step S1802. In addition, a third threshold value is realized, for example, by the predetermined value.

Moreover, an exemplary selection unit, in the case where the number of highlight pixels is equal to or greater than the first threshold value and equal to or smaller than the second threshold value and the number of pixels in the area 601 is equal to or greater than the third threshold value, is realized by executing the processing in step S906.

Furthermore, an exemplary selection unit, in the case where the number of highlight pixels is equal to or greater than the first threshold value and equal to or smaller than the second threshold value and the number of pixels in the area 601 is not equal to or greater than the third threshold value, is realized by executing the processing in step S908.

As described above, in the present exemplary embodiment, the mode to be used for printing is selected between the gloss mode and the transparent toner mode according to the number of pixels included in the area 601, in which the density of the color toners decreases by executing the development using the transparent toner in addition to the color toners. Thus, the present exemplary embodiment can prevent the failure of applying gloss desired by the user to the pixels included in the area 601 in addition to the effects achieved by the above-described first and second exemplary embodiments.

In the present exemplary embodiment, an appropriate mode is selected between the gloss mode and the transparent toner mode according to the result of counting of the highlight pixels as described in the second exemplary embodiment. However, the present exemplary embodiment is not limited to this.

For example, the operation according to the present exemplary embodiment can be applied by counting the number of 0% pixels as described above in the first exemplary embodiment. More specifically, it is also useful if the processing in steps S904, S905, and S907 in FIG. 9 is executed instead of executing the processing in steps S1705, S1706, and S1708 in FIG. 18.

Next, a fourth exemplary embodiment of the present invention will be described in detail below. In the first through third exemplary embodiments described above, the mode used for printing is automatically changed between two modes including the "gloss mode" and the "transparent toner once-fixing mode" for fixing the four colors of CMYK toners and the transparent toner at once.

On the other hand, in the present exemplary embodiment, the mode used for printing is automatically shifted among three modes including the "transparent toner twice-fixing mode", in addition to the above-described two modes, for developing and fixing the four colors of CMYK toners on the surface of the sheet before developing the transparent toner on the same surface of the sheet. The present exemplary embodiment is primarily different from the above-described first through third exemplary embodiments with respect to a part of the modes to be changed and a part of the processing for changing modes.

Accordingly, units and components that are the same as those in the above-described first through third exemplary embodiments are denoted by the same reference numerals and symbols as those illustrated in FIGS. 1 through 18. Accordingly, the detailed description thereof will not be repeated here. The differences between the embodiments are addressed in detail below.

Figure 19:
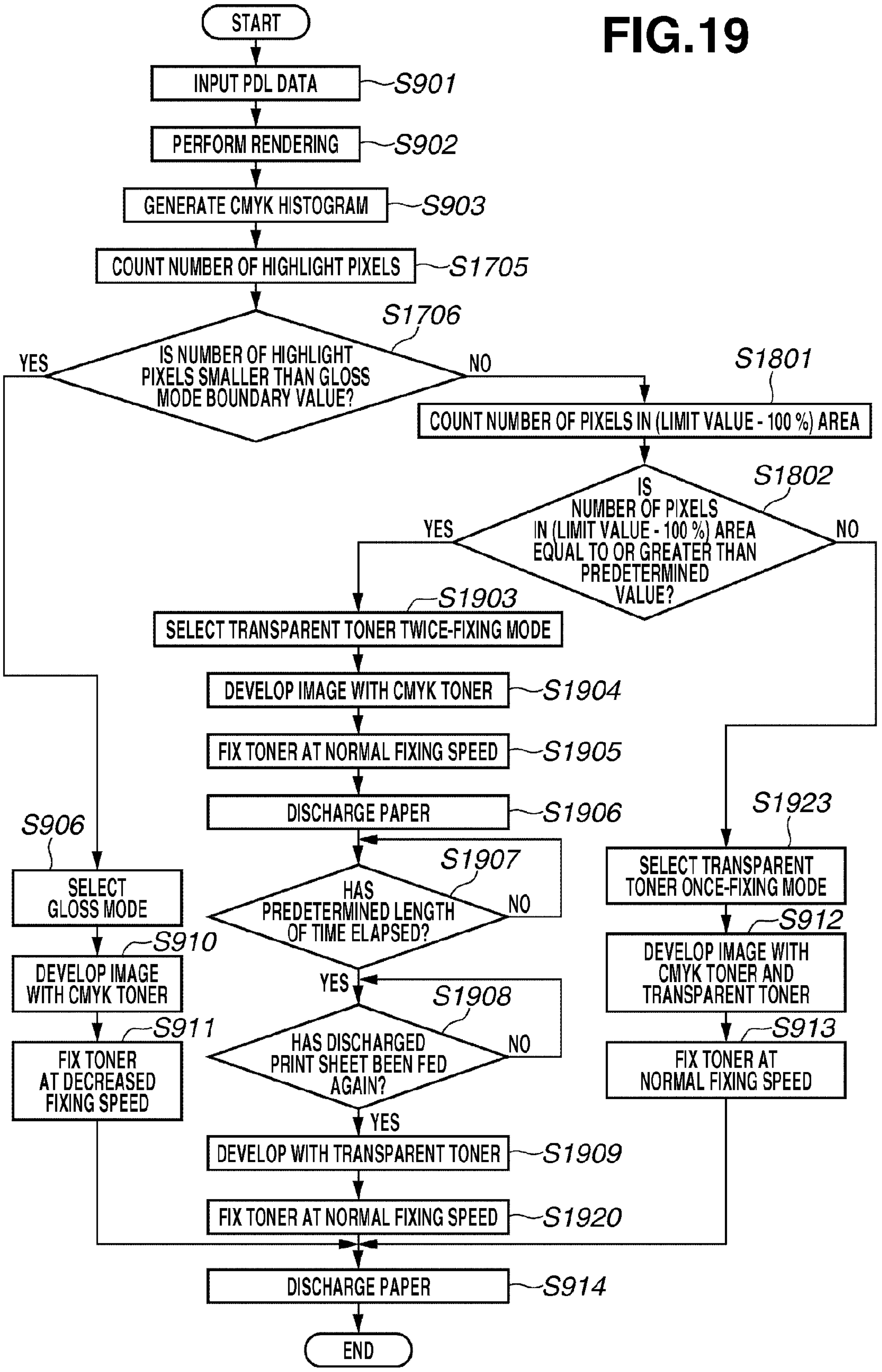
FIG. 19 is a flow chart illustrating exemplary processing executed by a printing apparatus according to a fourth exemplary embodiment of the present invention.

FIG. 19 is a flow chart illustrating exemplary processing executed by a printing apparatus 401 according to the present exemplary embodiment. Referring to FIG. 19, in steps S901 through S903 (see FIG. 9), the CPU 802 executes the same processing as that executed according to the flow chart in the above-described first exemplary embodiment. In addition, in steps S1705 and S1706 (see FIG. 17), the CPU 802 executes the same processing as that executed in the second exemplary embodiment.

In step S1705, the CPU 802 counts the number of highlight pixels. In step S1706, the CPU 802 determines whether the number of highlight pixels counted in step S1705 is equal to or smaller than the gloss mode boundary value 1402. If it is determined in step S1706 that the number of highlight pixels counted in step S1705 is smaller than the gloss mode boundary value 1402 (YES in step S1706), in which case the area of white pixels and highlight pixels on the surface of the sheet is small, then the processing proceeds to step S906 after the CPU 802 has determined that the gloss can be applied to the entire surface of the sheet by using the gloss mode. In step S906, the CPU 802 selects the gloss mode as the mode to be used for printing. In subsequent processing in steps S910 and S911 (see FIG. 9), the CPU 802 executes the same processing as that executed in the first exemplary embodiment.

On the other hand, if it is determined in step S1706 that the number of highlight pixels counted in step S1705 is equal to or greater than the gloss mode boundary value 1402 (NO in step S1706), then the processing proceeds to steps S1801 and S1802. In steps S1801 and S1802, the CPU 802 executes the same processing as that executed in the third exemplary embodiment (see FIG. 18).

In step S1801, the CPU 802 counts the number of pixels included in the area 601. In step S1802, the CPU 802 determines whether the number of pixels in the area 601 is equal to or greater than the predetermined value.

As described above, in the present exemplary embodiment, an exemplary first derivation unit is realized, for example, by executing the processing in step S1705. Furthermore, an exemplary second derivation unit is realized, for example, by executing the processing in step S1801.

In addition, an example of a first comparison unit is realized, for example, by executing the processing in step S1706. Moreover, an exemplary second comparison unit is realized, for example, by executing the processing in step S1802. In addition, a fourth threshold value is realized, for example, by the gloss mode boundary value 1402, for example while a fifth threshold value is realized by the predetermined value.

If it is determined in step S1802 that the number of pixels in the area 601 is equal to or greater than the predetermined value (YES in step S1802), then the processing proceeds to step S1903.

In step S1903, the CPU 802 selects the transparent toner twice-fixing mode as the mode to be used for printing. In the transparent toner twice-fixing mode, in step S1904, the printer engine 809 performs the development on the sheet by using the CMYK toners.

In step S1905, the printer engine 809 fixes the developed CMYK toners at the normal print speed. In step S1906, the printer engine 809 discharges the sheet on which the CMYK toners is fixed.

In step S1907, the printer engine 809 cools down (does not perform any processing on) the sheet discharged in step S1906 for a predetermined time in order to prevent the problem that may arise caused by twice-fixing of the transparent toner. More specifically, after completion of the processing in step S1906, the printer engine 809 can perform control for not receiving another sheet for a predetermined time or notifying the user that it is needed to wait for a predetermined time before setting (feeding) another sheet.

In step S1908, the printer engine 809 waits until the user feeds the sheet again that has been printed, discharged, and appropriately cooled down. In step S1909, the printer engine 809 develops the transparent toner on the entire surface of the printed sheet. In step S1920, the printer engine 809 fixes the developed transparent toner at the normal print speed. In step S914, the printer engine 809 discharges the sheet on which the CMYK toners and the transparent toner have been fixed as in the first exemplary embodiment.

By executing the above-described specific processing, the present exemplary embodiment can apply the gloss evenly on the entire surface of the sheet while suppressing the influence caused by the restriction of the amount of applied toner.

On the other hand, if it is determined in step S1802 that that the number of pixels in the area 601 is smaller than the predetermined value (NO in step S1802), in which case the CPU 802 determines that the data to be printed is data that is not so much affected by the restriction of the amount of applied toner, then the processing proceeds to step S1923.

In step S1923, the CPU 802 selects the transparent toner once-fixing mode as the mode to be used for printing. In the transparent toner once-fixing mode, the CPU 802 executes the processing of steps S912 through S914 (see FIG. 9) of the first exemplary embodiment.

In step S912, the printer engine 809 performs the development on the surface of the sheet by using both the CMYK toners and the transparent toner. In step S913, the printer engine 809 fixes the developed CMYK toners and the transparent toner at the normal print speed. Then, the processing proceeds to step S914. In step S914, the printer engine 809 discharges the sheet on which the CMYK toners and the transparent toner have been fixed.

As described above, in the present exemplary embodiment, an exemplary selection unit in the case where the number of highlight pixels is smaller than the fourth threshold value is realized, for example, by executing the processing in step S906. Furthermore, in the present exemplary embodiment, an exemplary selection unit in the case where the number of highlight pixels is equal to or greater than the fourth threshold value and the number of pixels in an area 603 is equal to or greater than the fifth threshold value is realized, for example, by executing the processing in step S1903.

In addition, an exemplary selection unit in the case where the number of highlight pixels is equal to or greater than the fourth threshold value and the number of pixels in the area 603 is smaller than the fifth threshold value is realized by executing, for example, the processing in step S1923.

By performing the above-described control, the printing apparatus having three modes including the gloss mode, the transparent toner once-fixing mode, and the transparent toner twice-fixing mode can automatically select an appropriate mode to achieve the effect according to each of the above-described exemplary embodiments.

In the present exemplary embodiment, an appropriate mode is selected between the gloss mode and the transparent toner mode based on the result of counting the highlight pixels as described in the second exemplary embodiment. However, the present exemplary embodiment is not limited to this. For example, the operation according to the present exemplary embodiment can be achieved, for example, by counting the number of the 0% pixels as described in the first exemplary embodiment. More specifically, the processing in steps S904 and S905 in FIG. 9 can be executed instead of the processing in steps S1705 and S1706 in FIG. 19. In addition, in the first through third exemplary embodiments, the transparent toner twice-fixing mode can be employed instead of the transparent toner once-fixing mode as the transparent toner mode.

Now, a fifth exemplary embodiment of the present invention will be described in detail below. In the above-described fourth exemplary embodiment, the CPU 802 automatically selects either one of the three modes including the gloss mode, the transparent toner once-fixing mode, and the transparent toner twice-fixing mode based on the influence by the restricted amount of toners to be applied. In this regard, however, compared with the gloss mode and the transparent toner once-fixing mode, the load on the user, when the transparent toner twice-fixing mode is used, is much higher in terms of the time to be taken in completing the printing and the relatively large number of operations performed by the user.

Accordingly, in the present exemplary embodiment, the transparent toner twice-fixing mode is not used according to an instruction by a user, even though a printing apparatus has the above-described three modes. As described above, the present exemplary embodiment is different from the fourth exemplary embodiment in a part of the processing for changing the print mode.

Accordingly, units and components that are the same as those in the above-described first through fourth exemplary embodiments are denoted by the same reference numerals and symbols as those illustrated in FIGS. 1 through 19. Accordingly, the detailed description thereof will not be repeated here. The differences between the embodiments are addressed in detail below. Herein below, a method according to the present exemplary embodiment will be described.

Figure 20:
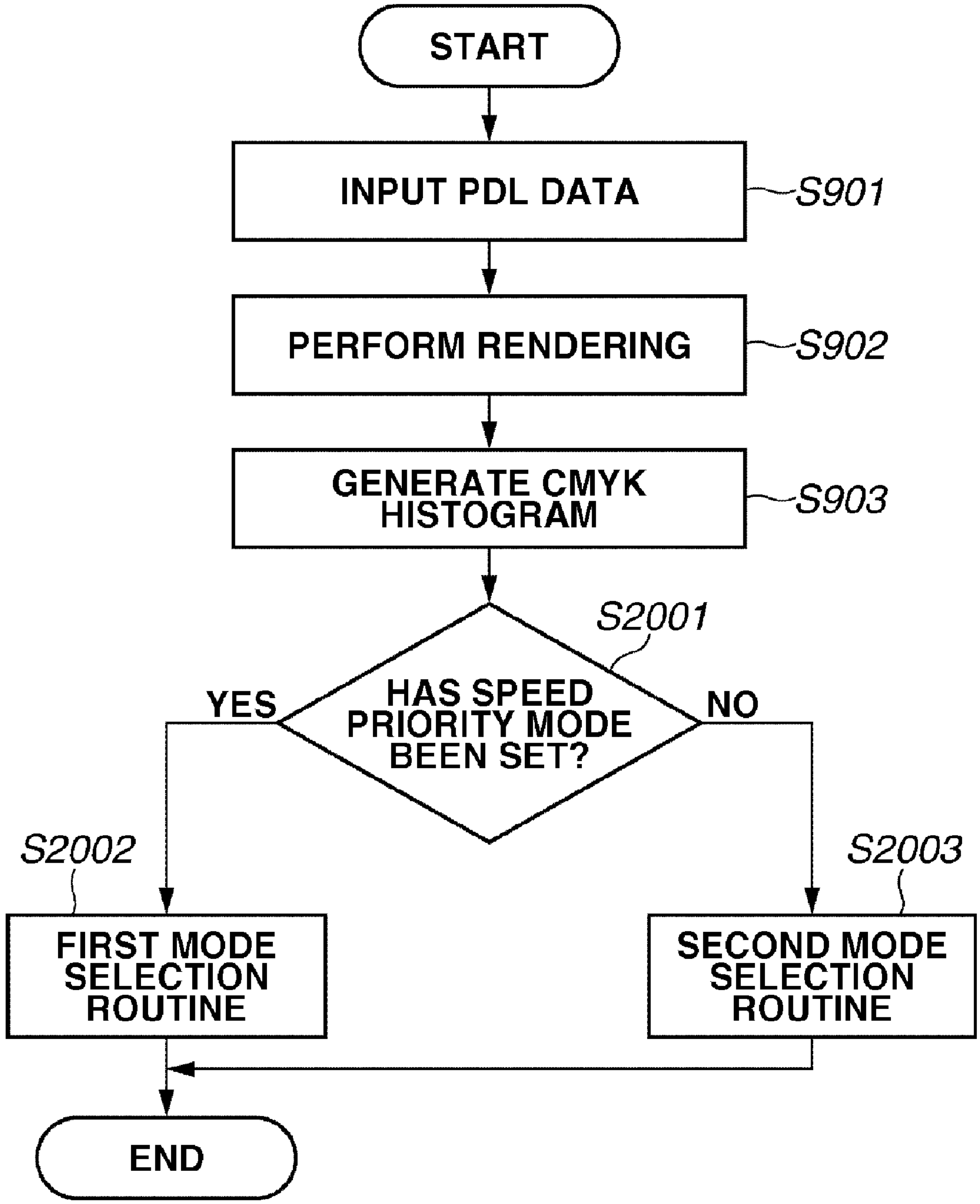
FIG. 20 is a flow chart illustrating exemplary processing executed by a printing apparatus according to a fifth exemplary embodiment of the present invention.

FIG. 20 is a flow chart illustrating exemplary processing of the printing apparatus according to the present exemplary embodiment. Referring to FIG. 20, in steps S901 through S903 (see FIG. 9), the CPU 802 executes the same processing as that in the above-described first exemplary embodiment.

In step S2001, the CPU 802 determines whether a speed priority mode has been set ON. The speed priority mode has been set by the user in advance and is stored on the HDD 803.

If it is determined in step S2001 that the speed priority mode has been set ON (YES in step S2001), then the processing proceeds to step S2002. In step S2002, the CPU 802 executes a first mode selection routine. The first mode selection routine is a routine for executing printing by automatically selecting either one of the three modes including the gloss mode and the transparent toner mode (the transparent toner once-fixing mode) excluding the transparent toner twice-fixing mode described above in the first through third exemplary embodiments. More specifically, the CPU 802 executes, for example, either one of the processing in step S904 and subsequent processing (FIG. 9), the processing in step S1705 and subsequent processing (FIG. 17), and the processing in step S1705 and subsequent processing (FIG. 18).

On the other hand, if it is determined in step S2001 that the speed priority mode has been set OFF (NO in step S2001), then the processing proceeds to step S2003.

In step S2003, the CPU 802 executes a second mode selection routine. In the second mode selection routine, the gloss is applied in priority over the print speed. In this case, the CPU 802 executes, for example, the printing by automatically selecting either one of the three modes including the gloss mode, the transparent toner once-fixing mode, and the transparent toner twice-fixing mode described above in the fourth exemplary embodiment. More specifically, the CPU 802 executes the processing in step S1705 and subsequent processing (see FIG. 19).

As described above, in the present exemplary embodiment, the user can previously set whether the transparent toner twice-fixing mode is selected automatically as one of choices for the printing mode.

With the above-described configuration, the present exemplary embodiment can realize the effect that the user can select whether to prioritize the print speed (avoid the possible load on the user) or the gloss as well as the effects according to the first through fourth exemplary embodiments.

Now, a sixth exemplary embodiment of the present invention will be described in detail below. In the above-described first through fifth exemplary embodiments, the printing apparatus 401 receives normal PDL data, which does not include information about the gloss, and analyses the received PDL data by itself. Thus, the CPU 802 selects an appropriate mode.

On the other hand, in the present exemplary embodiment, a host computer (a printer driver), which is configured to generate PDL data, performs the analysis and notifies the appropriate mode determined based on a result of the analysis to the printing apparatus. The present exemplary embodiment is primarily different from the above-described first through fifth exemplary embodiments with respect to the apparatus that determines the mode to be used for printing.

Accordingly, units and components that are the same as those in the above-described first through fifth exemplary embodiments are denoted by the same reference numerals and symbols as those illustrated in FIGS. 1 through 20. Accordingly, the detailed description thereof will not be repeated here. The differences between the embodiments are addressed in detail below.

Figure 21:
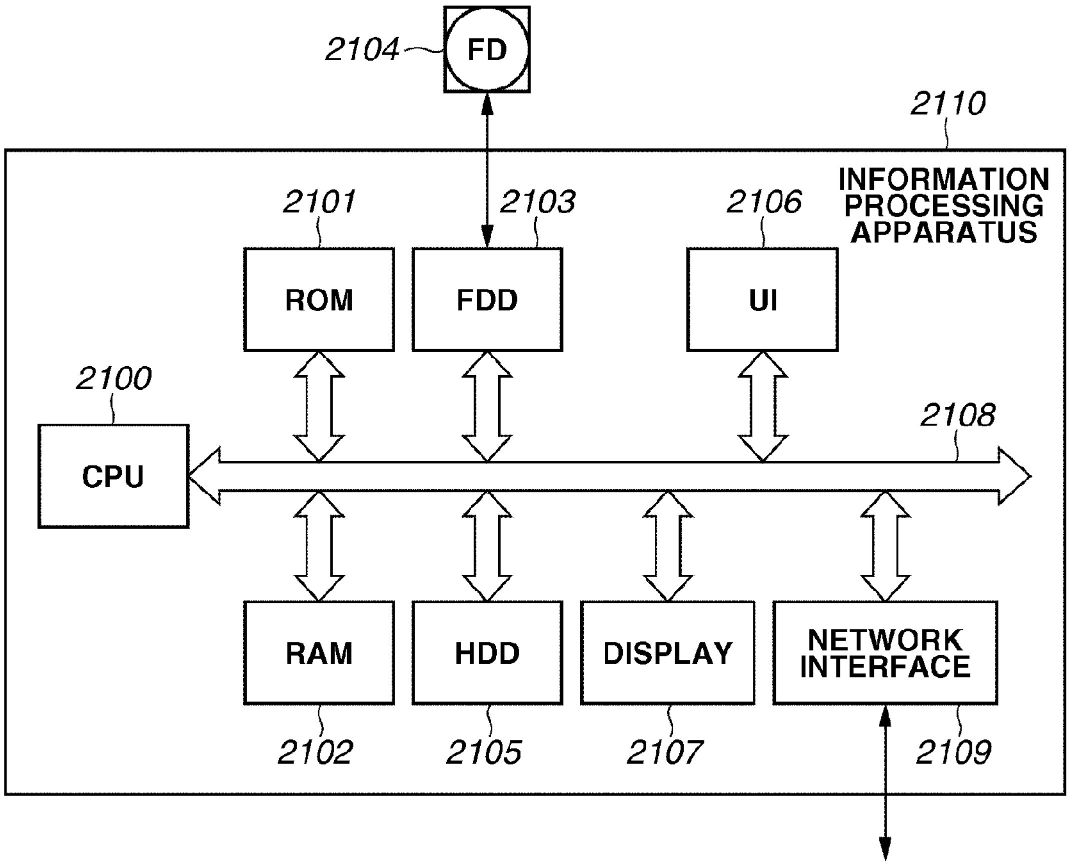
FIG. 21 illustrates an exemplary configuration of an information processing apparatus (host computer) on which a printer driver is installed according to a sixth exemplary embodiment of the present invention.

FIG. 21 illustrates an exemplary configuration of an information processing apparatus (host computer) on which the printer driver is installed in advance according to the present exemplary embodiment. Referring to FIG. 21, a CPU 2100 executes a program stored on an HDD 2105. As the programs executed by the CPU 2100, an application program, a printer driver program, an operating system (an OS), and a network printer control program can be included.

Furthermore, the CPU 2100 executes control for temporarily storing information and a file necessary to execute the program on a RAM 2102 while executing the program.

A ROM 2101 is a storage medium storing programs, such as a basic input/output (I/O) program, and various data, such as font data used in processing a document. The RAM 2102 is a storage medium for temporarily storing data. The RAM 2102 functions as a main memory or a work area of the CPU 2100. A flexible disk drive (FDD) 2103 is used to load programs stored on a flexible disk (FD) (storage medium) 2104 on a storage unit of the information processing apparatus 2110.

The storage medium is not limited to an FD. For example, any machine readable storage medium, such as a compact disc-read only memory (CD-ROM), a CD-recordable (CD-R), a CD-rewritable (CD-RW), a personal computer (PC) card, a digital versatile disc (DVD), an integrated circuit (IC) memory card, a magneto-optical disk (MO), or a memory stick can be utilized in addition to or instead of an FD.

A hard disk drive (HDD) 2105 is an external storage device that functions as a large capacity memory. On the HDD 2105, application programs, a printer driver program, an OS, a network printer control program, and related programs are stored. Furthermore, a spooler is stored on the HDD 2105.

A user interface (UI) 2106 is an interface that can be operated by the user to input an instruction. More specifically, the UI 2106 includes a keyboard and a mouse. The user instructs to input a control command to the printing apparatus on the information processing apparatus 2110 via the keyboard and the mouse of the UI 2106.

A display 2107 displays the control command input from the UI 2106 and the state of the printing apparatus. The display 2107 can be realized, for example, by a liquid crystal display (LCD).

A system bus 2108 is a data transmission path within the information processing apparatus 2110. A network I/F 2109 connects the information processing apparatus 2110 to a network. Thus, the information processing apparatus 2110 can perform data communication with an external apparatus such as a printing apparatus via the network I/F 2109.

Figure 22:
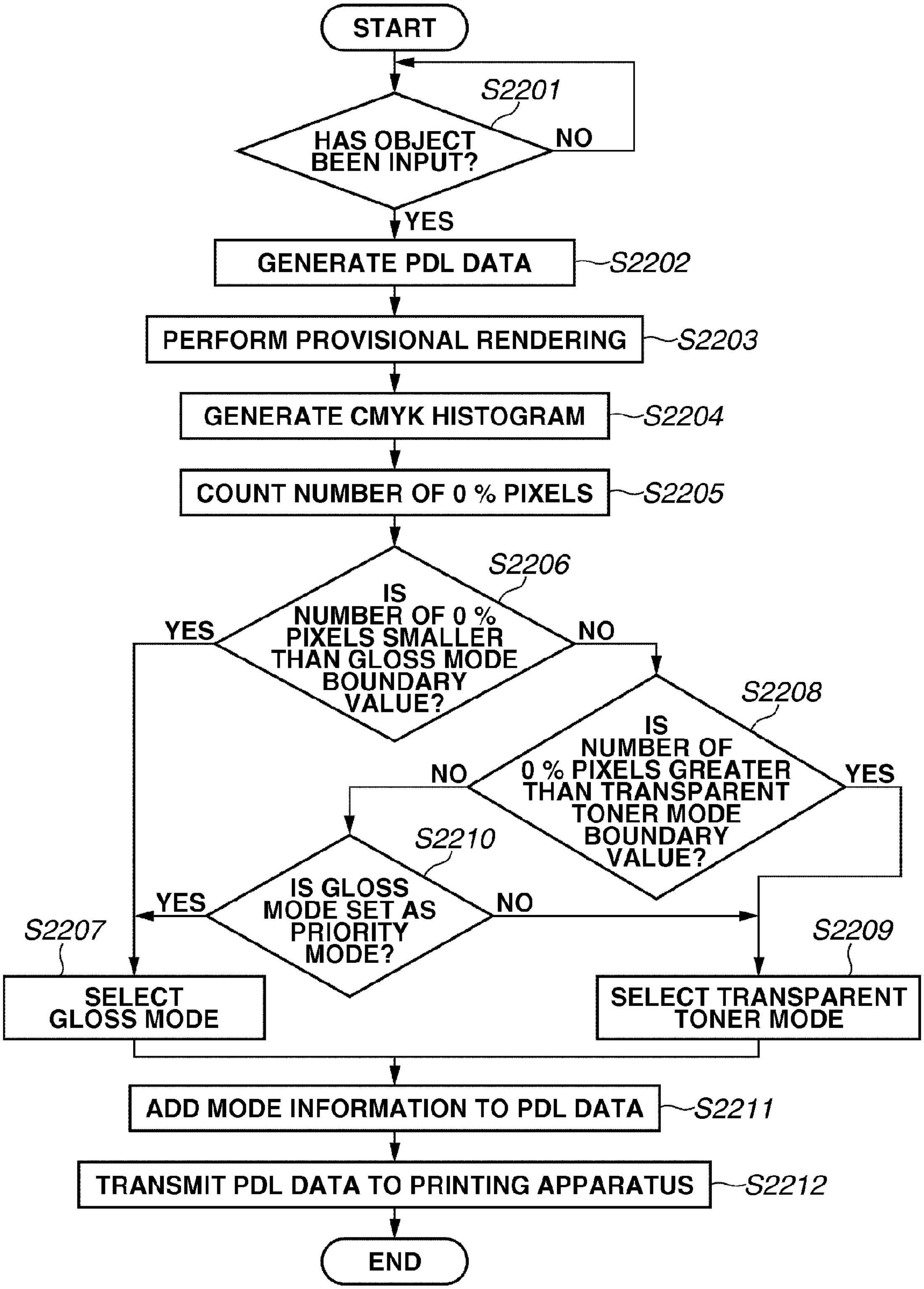
FIG. 22 is a flow chart illustrating exemplary processing executed by the information processing apparatus (host computer) according to the sixth exemplary embodiment of the present invention.

FIG. 22 is a flow chart illustrating exemplary processing executed by the information processing apparatus (the host computer) 2110 according to the present exemplary embodiment. Each step of the flow chart in FIG. 22 is executed by the CPU 2100 of the information processing apparatus (the host computer) 2110.

Referring to FIG. 22, in step S2201, a graphic interface waits until an object such as a text, an image, or graphics is input. Here, the graphic interface is, for example, Windows GDI®. In step S2202, the printer driver generates PDL data according to the object input in step S2201.

As described above, in the present exemplary embodiment, image data is realized, for example, by the PDL data. Furthermore, an exemplary acquisition unit is realized, for example, by the processing executed in the processing in step S2201.

In step S2203, the printer driver analyzes the PDL data generated in step S2202 to generate the CMYK histogram illustrated in FIGS. 11, 13, and 16. Then, the printer driver converts the PDL data into contone data having a multivalued signal value for each of four colors of CMYK. The processing is referred to as "provisional rendering". In step S2204, the printer driver generates the CMYK histogram based on the signal values of pixels, which constitute the contone data generated in step S2203.

As described above, in the present exemplary embodiment, an exemplary histogram generation unit is realized, for example, by executing the processing in step S2204.

In step S2205, the printer driver counts the number of 0% pixels based on the histogram generated in step S2204. As described above, in the present exemplary embodiment, an exemplary derivation unit is realized by executing the processing in step S2205.

In step S2206, the printer driver determines whether the number of 0% pixels counted in step S2205 is smaller than the gloss mode boundary value 1402, which is stored in advance on the HDD 2105. If it is determined in step S2206 that the number of 0% pixels counted in step S2205 is smaller than the gloss mode boundary value 1402 (YES in step S2206), then the processing proceeds to step S2207. In step S2207, the printer driver selects the gloss mode as the mode to be used for printing.

On the other hand, if it is determined in step S2206 that the number of 0% pixels counted in step S2205 is equal to or greater than the gloss mode boundary value 1402 (NO in step S2206), then the processing proceeds to step S2208. In step S2208, the printer driver determines whether the number of 0% pixels counted in step S2205 is greater than the transparent toner mode boundary value 1404 stored in advance on the HDD 2105.

If it is determined in step S2208 that the number of 0% pixels counted in step S2205 is greater than the transparent toner mode boundary value 1404 (YES in step S2208), then the processing proceeds to step S2209. In step S2209, the printer driver selects the transparent toner mode as the mode to be used for printing.

As described above, in the present exemplary embodiment, an exemplary comparison unit is realized by executing the processing in steps S2206 and S2208, for example. Furthermore, the first threshold value is realized, for example, by the gloss mode boundary value 1402. In addition, the second threshold value is realized, for example, by the transparent toner mode boundary value 1404.

On the other hand, if it is determined in step S2208 that the number of 0% pixels counted in step S2205 is equal to or smaller than the transparent toner mode boundary value 1404 (NO in step S2208), then the processing proceeds to step S2210.

In step S2210, the printer driver determines which of the gloss mode and the transparent toner mode has been set as the priority mode. Here, the priority mode has been set in advance by the user, and is stored, for example, on the HDD 2105.

If it is determined in step S2210 that the gloss mode has been set as the priority mode (YES in step S2210), then the processing proceeds to step S2207. In step S2207, the printer driver selects the gloss mode as the mode to be used for printing. On the other hand, if it is determined in step S2210 that the transparent toner mode has been set as the priority mode (NO in step S2210), then the processing proceeds to step S2209. In step S2209, the printer driver selects the transparent toner mode as the mode to be used for printing.

As described above, in the present exemplary embodiment, an exemplary selection unit in the case where the number of 0% pixels is smaller than the first threshold value is realized, for example, by executing the processing in step S2206. Furthermore, an exemplary selection unit in the case where more the number of 0% pixels is greater than the second threshold value is realized, for example, by executing the processing in step S2208.

In addition, an exemplary selection unit in the case where the number of 0% pixels is equal to or greater than the first threshold value and equal to or smaller than the second threshold value is realized, for example, by executing the processing in steps S2206, S2208, and S2210.

After the mode has been selected in the above-described manner, the processing proceeds to step S2211. In step S2211, the printer driver adds job attribute information including the selected mode to the PDL data generated in step S2202. The job attribute information is described, for example, by the Printer Job Language (PJL).

In step S2212, the network I/F 2109 transmits the PDL data, to which the job attribute information has been added in step S2211, to the printing apparatus instructed by the user. Then, the processing according to the flowchart in FIG. 22 ends.

As described above, in the present exemplary embodiment, an exemplary transmission unit is realized, for example, by executing the processing in step S2211.

Figure 23:
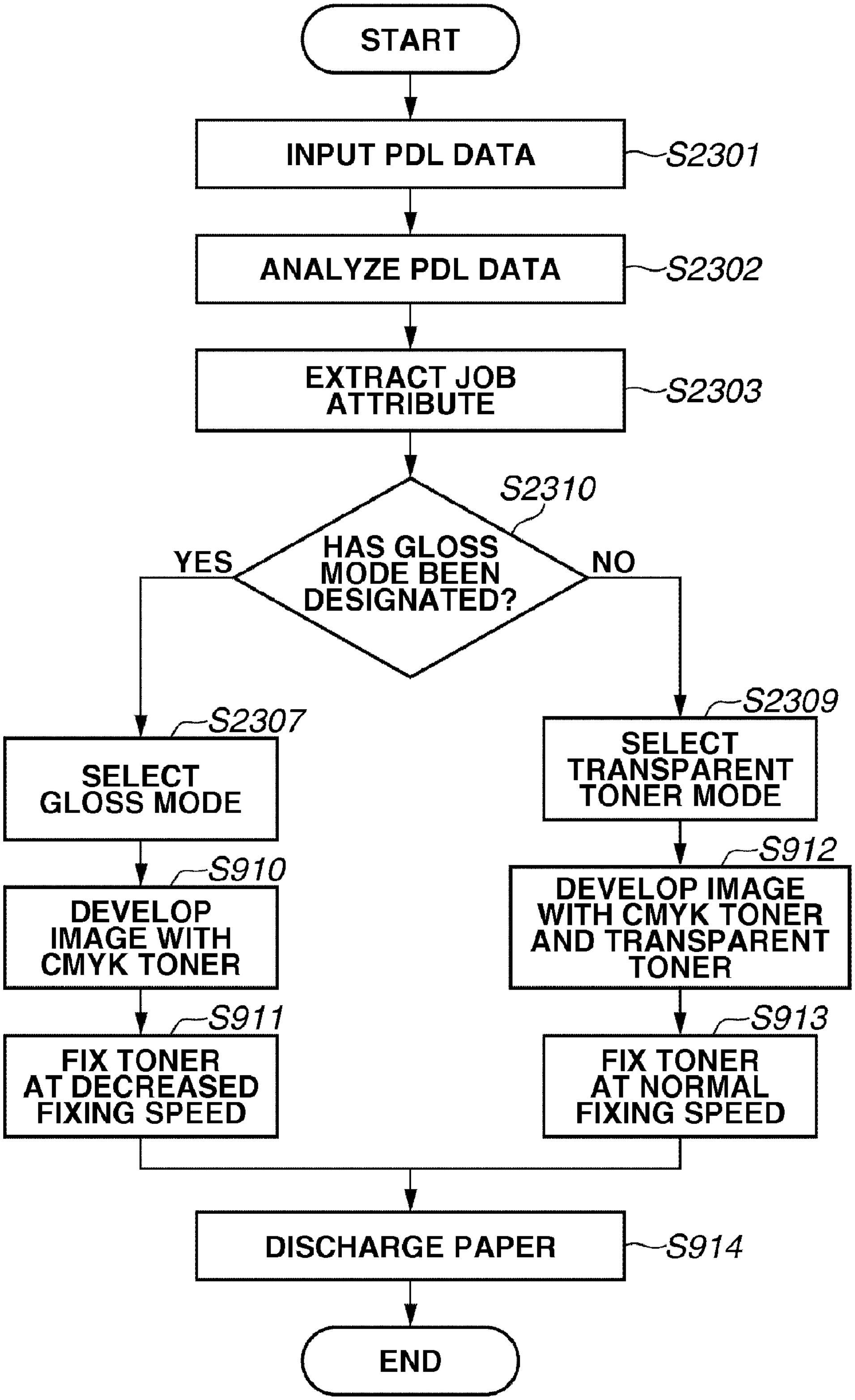
FIG. 23 is a flow chart illustrating exemplary processing executed by the printing apparatus according to the sixth exemplary embodiment of the present invention.

FIG. 23 is a flow chart illustrating exemplary processing executed by a printing apparatus according to the present exemplary embodiment. The hardware configuration of the printing apparatus can be realized, for example, by the exemplary configuration illustrated in FIG. 8.

Referring to FIG. 23, in step S2301, the network I/F 804 receives the PDL data from the information processing apparatus (the host computer) 2110 via the network. In step S2302, the CPU 802 analyzes the PDL data input in step S2301.

In step S2303, the CPU 802 extracts job attribute information from the PDL data. In step S2310, the CPU 802 determines which mode has been designated according to the job attribute information extracted in step S2303.

If it is determined in step S2310 that the gloss mode has been designated (YES in step S2310), then the processing proceeds to step S2307. In step S2307, the CPU 802 selects the gloss mode as the mode to be used for printing. Then, in steps S910, S911, and S914, the CPU 802 executes the same processing as that in the first exemplary embodiment (see FIG. 9).

On the other hand, if it is determined in step S2310 that the transparent toner mode has been designated (NO in step S2310), then the processing proceeds to step S2309. In step S2309, the CPU 802 selects the transparent toner mode as the mode to be used for printing. In steps S912 through S914, the same processing as that in the first exemplary embodiment is performed.

By performing the above-described control on the printer driver and the printing apparatus, the present exemplary embodiment can achieve the effect of applying the gloss by automatically selecting an appropriate mode as in the first exemplary embodiment.

In the above description, the present exemplary embodiment is described based on the first exemplary embodiment. However, the present exemplary embodiment is not limited to this.

For example, the present exemplary embodiment can also be applied to the second through the sixth exemplary embodiments.

Now, a seventh exemplary embodiment of the present invention will be described in detail below. In the above-described first through sixth exemplary embodiments, either one of the gloss mode and the transparent toner mode is selected exclusively against each other. On the other hand, the present exemplary embodiment executes the processing in the gloss mode and the processing in the transparent toner mode in parallel to each another.

In the present exemplary embodiment, the color toners are slowly fixed by decreasing the fixing speed while the transparent toner is applied at the same time. Thereby, both effects can be obtained. Accordingly, the present exemplary embodiment is primarily different from the above-described first through sixth exemplary embodiments with respect to a part of the processing for applying the mode.

Accordingly, units and components that are the same as those in the above-described first through sixth exemplary embodiments are denoted by the same reference numerals and symbols as those illustrated in FIGS. 1 through 23. Accordingly, the detailed description thereof will not be repeated. However, the differences between the embodiments are addressed in detail below.

Figure 24A:
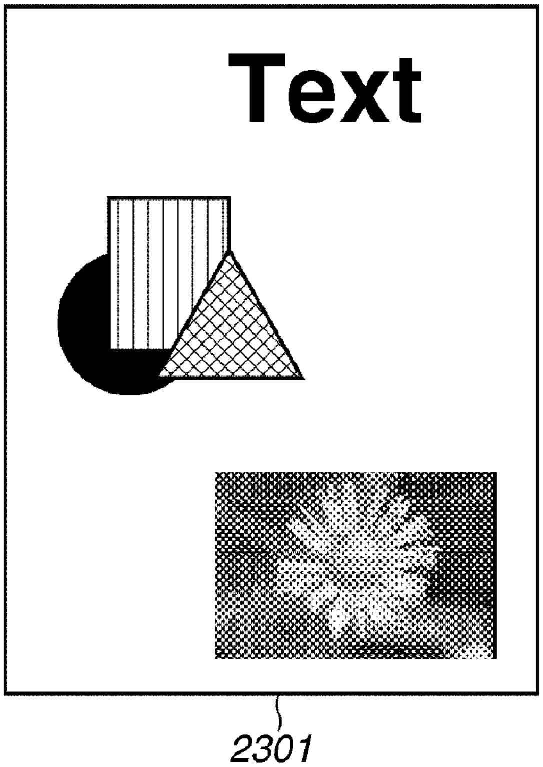
FIGS. 24A and 24B illustrate an example of print data and a transparent toner object applied to the print data, respectively, according to a seventh exemplary embodiment of the present invention.
Figure 24B:
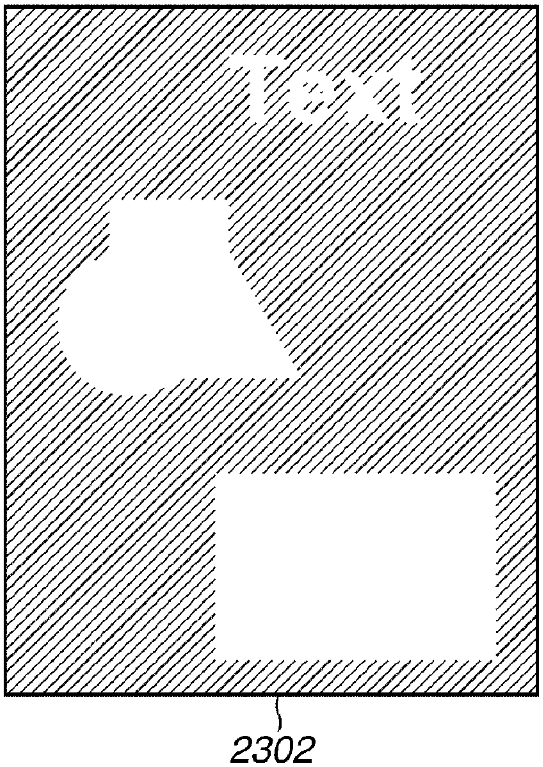

FIGS. 24A and 24B illustrate an example of print data and a transparent toner object, which is applied to the print data, respectively, according to the present exemplary embodiment. Referring to FIG. 24A, print data 2301 includes a text, graphics, and a photograph. Most area of the print data 2301 is a blank white area. With respect to the print data 2301 having the above-described configuration, the present exemplary embodiment applies the transparent toner on a transparent toner object 2302 (see FIG. 24B) and uses the gloss mode at the same time to evenly apply the gloss to the entire surface of the sheet.

Figure 25:
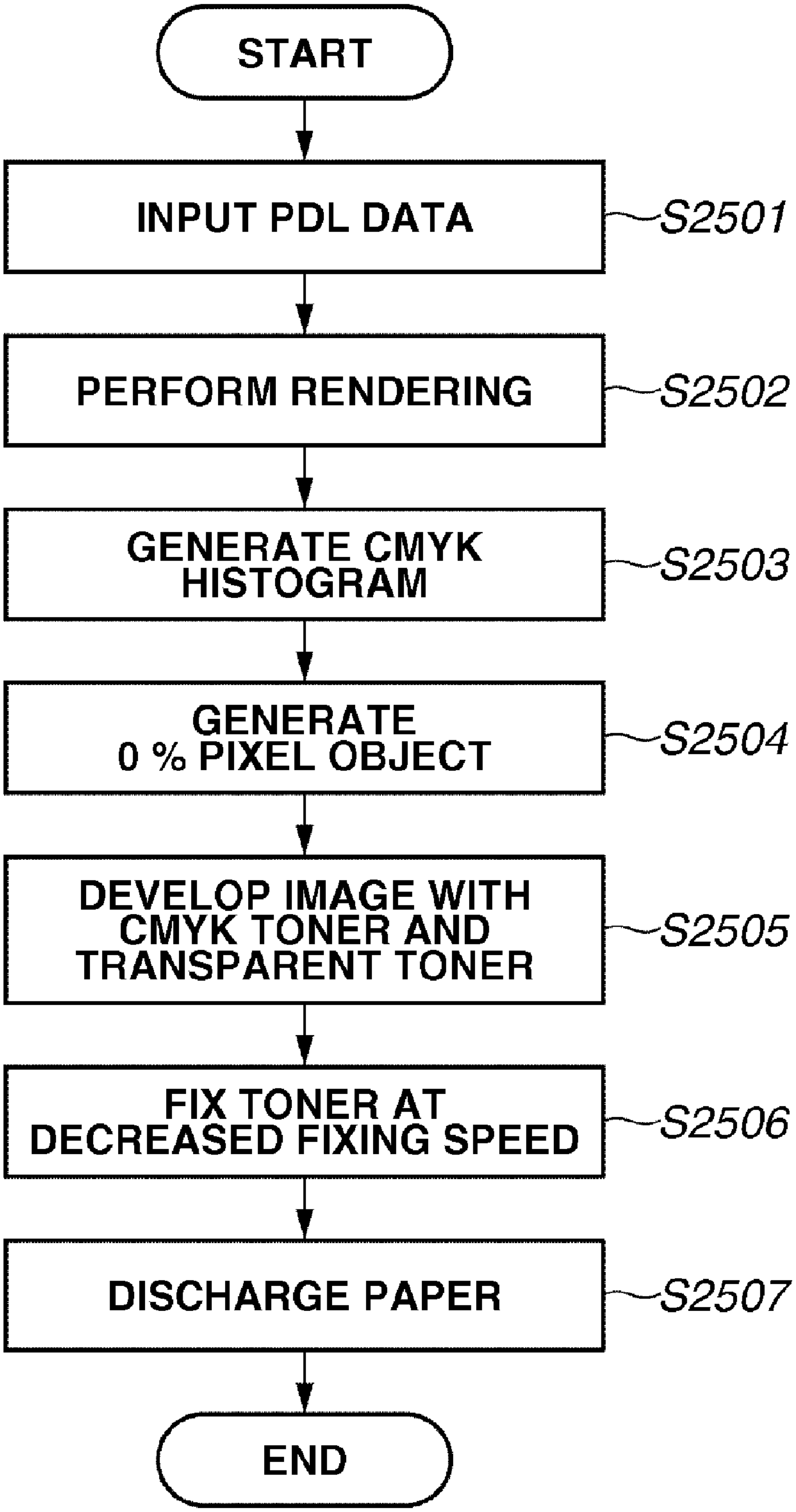
FIG. 25 is a flow chart illustrating exemplary processing executed by the printing apparatus according to the seventh exemplary embodiment of the present invention.

FIG. 25 is a flow chart illustrating exemplary processing executed by the printing apparatus according to the present exemplary embodiment. Referring to FIG. 25, in step S2501, the network I/F 804 receives the PDL data from an external network. In step S2502, the CPU 802 renders the PDL data input in step 2501.

In step S2503, the CPU 802 generates a CMYK histogram based on a result of the rendering in step S2502. In the present exemplary embodiment, the 0% pixels (the white pixels) are interested in the histogram.

In step S2504, the CPU 802 determines an object to be a background white object, which, of the 0% pixels, does not belong to any object. The CPU 802 generates a transparent toner object 2302 including 0% pixels based on the background white object.

In step S2505, the printer engine 809 performs the development of the four colors of CMYK on the surface of the sheet. Furthermore, the printer engine 809 uses the transparent toner to develop the transparent toner object 2302 on the same surface of the sheet as the sheet on which the four colors of CMYK have been developed.

In step S2506, the printer engine 809 fixes five colors of toners developed in step S2505 at the speed slower than the normal print speed. In step S2507, the printer engine 809 discharges the sheet on which the five colors of toners have been fixed.

As described above, the present exemplary embodiment generates the transparent toner object 2302 having 0% pixels based on the object that does not belong to any object, among the 0% pixels. Furthermore, the transparent toner object 2302 is developed on the surface of the sheet by using the transparent toner using the transparent toner mode. While executing the development processing, the present exemplary embodiment develops the four colors of CMYK corresponding to the other objects on the surface of the same sheet as the surface of the sheet on which the transparent toner object 2302 has been developed.

As described above, in the present exemplary embodiment, the gloss mode is applied on the surface of the sheet on which the five colors of toners have been developed. Furthermore, the developed five colors of toners are fixed at a speed slower than the normal speed. Thus, the gloss can be applied to both the transparent toner and the color toners.

In the present exemplary embodiment, the printing apparatus executes the above-described processing. However, the present exemplary embodiment is not limited to this. For example, a similar effect can be realized if the printer driver executes the processing described in the present exemplary embodiment.

In this case, for example, the printer driver executes the processing in steps S2501 through S2504 in FIG. 25 to transmit the transparent toner object 2302 and the PDL data to the printing apparatus while the printing apparatus executes the processing in steps S2505 through S2507 based on the received transparent toner object 2302 and PDL data.

Furthermore, the highlight pixel described in the second exemplary embodiment can be applied in the processing of the present exemplary embodiment instead of the 0% pixels.

In addition, it is also useful if the method for generating the gloss according to the present exemplary embodiment is employed as the printing mode in the above-described first through sixth exemplary embodiments.

Each unit and component constituting the image forming apparatus and the information processing apparatus and each step constituting the image forming method and the information processing method according to each of the above-described exemplary embodiments of the present invention can also be realized by executing a program stored on a RAM or a ROM of a computer with a CPU of the computer. The program and a computer-readable recording medium recording the program are included in the scope of the present invention.

Furthermore, the present invention can be realized, for example, in a system, an apparatus, a method, a program, or a storage medium storing the program. More specifically, the present invention can be applied to a system including a plurality of devices and to an apparatus that includes one device.

Note that the present invention can be realized by directly or remotely supplying a program of software realizing functions of the above-described exemplary embodiments (in the exemplary embodiments, the program corresponding to the processing performed according to the flow charts in FIG. 9, FIGS. 17 through 20, FIGS. 22 and 23, and FIG. 25) to a system or an apparatus. The present invention can also be realized by reading and executing the supplied program code by the system or a computer of the apparatus.

Accordingly, the program code itself, which is installed on the computer for performing the functional processing of the present invention by the computer, realizes the present invention. That is, the present invention also includes the computer program realizing the functional processing of the present invention.

Accordingly, the program can be configured in any form, such as object code, a program executed by an interpreter, and script data supplied to an OS.

As the recording medium for supplying such program code, a floppy disk, a hard disk, an optical disk, an MO, a CD-ROM, a CD-R, a CD-RW, a magnetic tape, a nonvolatile memory card, a ROM, and a DVD (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be realized by dividing the program code into a plurality of files and downloading each divided file from different web sites. That is, a World Wide Web (WWW) server for allowing a plurality of users to download the program file for realizing the functional processing configures the present invention.

In addition, the encrypted program can also be supplied by distributing a storage medium such as a CD-ROM and the like, which stores the program according to the present invention, by allowing the user who is qualified for a predetermined condition to download key information for decoding the encryption from the web site via the Internet, and by executing the encrypted program code to install it on the computer by using the key information.

In addition, the functions according to the embodiments described above can be realized by executing the program code read by the computer. In addition, the functions are realized by the processing in which an OS or the like carries out a part of or the whole of the actual processing based on an instruction given by the program code.

Additionally, the program code read out of a storage medium can be written into a memory of a function expansion board equipped in a computer or into a memory of a function expansion unit connected to the computer. In this case, based on instructions of the program, a CPU provided on the function expansion board or the function expansion unit can execute part or all of the processing to realize the functions of the above-described exemplary embodiments.

With the above-described configuration, each of the embodiments of the present invention can output a print product having an appropriate gloss.

While the present invention has been described with reference to exemplary embodiments is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-035097 filed Feb. 15, 2008, which is hereby incorporated by reference herein in its entirety.

What is claimed is:

1. An image forming apparatus comprising:
- an acquisition unit configured to acquire image data;
- a generation unit configured to generate a histogram based on a signal value of each pixel in the image data acquired by the acquisition unit;
- a derivation unit configured to derive the number of pixels matching a specific condition in the histogram generated by the generation unit;
- a comparison unit configured to compare the number of pixels derived by the derivation unit with a first threshold value and a second threshold value that is greater than the first threshold value; and
- a selection unit configured to select a fixing processing adjustment mode for increasing a degree of gloss of a print product by adjusting fixing processing if the number of pixels derived by the derivation unit is smaller than the first threshold value and select a transparent toner mode for increasing a degree of gloss of a print product by using a transparent toner if the number of pixels derived by the derivation unit is greater than the second threshold value.

2. The image forming apparatus according to claim 1, wherein the fixing processing adjustment mode includes a method for executing printing by adjusting a speed of fixing color toners without using the transparent toner.

3. The image forming apparatus according to claim 1, wherein the selection unit selects a mode that has been set in advance to be executed as a priority mode from among the fixing adjustment mode and the transparent toner mode if the number of pixels derived by the derivation unit is equal to or greater than the first threshold value and equal to or smaller than the second threshold value.

4. An image forming method comprising:
- acquiring image data;
- generating a histogram based on a signal value of each pixel in the acquired image data;
- deriving the number of pixels matching a specific condition in the generated histogram;
- comparing the derived number of pixels with a first threshold value and a second threshold value that is greater than the first threshold value; and
- selecting a fixing processing adjustment mode for increasing a degree of gloss of a print product by adjusting fixing processing if the derived number of pixels is smaller than the first threshold value and selecting a transparent toner mode for increasing a degree of gloss of a print product by using a transparent toner if the derived number of pixels is greater than the second threshold value.

5. The image forming method according to claim 4, further comprising executing printing by adjusting a speed for fixing color toners without using the transparent toner if the fixing processing adjustment mode is selected.

6. The image forming method according to claim 4, further comprising selecting a mode that has been set in advance to be executed as a priority mode from among the fixing adjustment mode and the transparent toner mode if the derived number of pixels is equal to or greater than the first threshold value and equal to or smaller than the second threshold value.

7. A non-transitory computer-readable storage medium storing instructions which, when executed by an image forming apparatus, cause the image forming apparatus to perform a method, the method comprising:
- acquiring image data;
- generating a histogram based on a signal value of each pixel in the acquired image data;
- deriving the number of pixels matching a specific condition in the generated histogram;
- comparing the derived number of pixels with a first threshold value and a second threshold value that is greater than the first threshold value; and
- selecting a fixing processing adjustment mode for increasing a degree of gloss of a print product by adjusting a speed of executing fixing processing if the derived number of pixels is smaller than the first threshold value and selecting a transparent toner mode for increasing a degree of gloss of a print product by using a transparent toner if the derived number of pixels is greater than the second threshold value.

8. The non-transitory computer-readable storage medium according to claim 7, wherein the method further comprises executing printing by adjusting a speed for fixing color toners without using the transparent toner if the fixing processing adjustment mode has been selected.

9. The non-transitory computer-readable storage medium according to claim 7, wherein the method further comprises selecting a mode that has been set in advance to be executed as a priority mode from among the fixing adjustment mode and the transparent toner mode if the derived number of pixels is equal to or greater than the first threshold value and equal to or smaller than the second threshold value.

10. The image forming apparatus according to claim 1, wherein the specific condition is a condition of a pixel whose sum of CMYK toner values is 0%.

* * * * *